(12) United States Patent
Ooshima et al.

(10) Patent No.: US 6,731,479 B2
(45) Date of Patent: May 4, 2004

(54) SPIN-VALVE THIN-FILM MAGNETIC ELEMENT WITH A FERROMAGNETIC UNDERLAYER OF HARD BIAS

(75) Inventors: Masahiro Ooshima, Niigata-ken (JP); Naoya Hasegawa, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 222 days.

(21) Appl. No.: 09/883,158

(22) Filed: Jun. 14, 2001

(65) Prior Publication Data
US 2001/0055185 A1 Dec. 27, 2001

(30) Foreign Application Priority Data
Jun. 20, 2000 (JP) ........................................ 2000-185346

(51) Int. Cl.$^7$ ................................................ G11B 5/39
(52) U.S. Cl. ................................................ 360/324.12
(58) Field of Search ........................ 360/324.11, 324.12

(56) References Cited

U.S. PATENT DOCUMENTS

| | | | | |
|---|---|---|---|---|
| 5,528,440 A | * | 6/1996 | Fontana et al. | 360/324.12 |
| 5,883,764 A | * | 3/1999 | Pinarbasi | 360/322 |
| 6,111,722 A | | 8/2000 | Fukuzawa et al. | |
| 6,118,624 A | | 9/2000 | Fukuzawa et al. | |
| 6,146,776 A | * | 11/2000 | Fukuzawa et al. | 428/692 |
| 2001/0014000 A1 | * | 8/2001 | Tanaka et al. | 360/324.12 |
| 2002/0075722 A1 | * | 6/2002 | Ooshima | 365/158 |
| 2003/0026047 A1 | * | 2/2003 | Chien et al. | 360/324.1 |

FOREIGN PATENT DOCUMENTS

JP    2000090419 A  *  3/2000  ............ G11B/5/39

* cited by examiner

Primary Examiner—William Klimowicz
(74) Attorney, Agent, or Firm—Brinks Hofer Gilson & Lione

(57) ABSTRACT

A spin-valve thin-film magnetic element includes a laminate formed on a substrate, the laminate including an antiferromagnetic layer, a pinned magnetic layer in contact with the antiferromagnetic layer, a nonmagnetic conductive layer in contact with the pinned magnetic layer, and a free magnetic layer in contact with the nonmagnetic conductive layer; bias layers formed on both sides in the track-width direction of the laminate; and electrode layers formed on the bias layers. The bias layers are in contact with both sides of the laminate and extend over the peripheral sections of the laminate with ferromagnetic bias underlying layers therebetween, the bias underlying layers being composed of Fe or an Fe—Co alloy with a thickness of 1.6 to 4.3 nm. A method for fabricating a spin-valve thin-film magnetic element is also disclosed.

6 Claims, 16 Drawing Sheets

FIG. 15
PRIOR ART
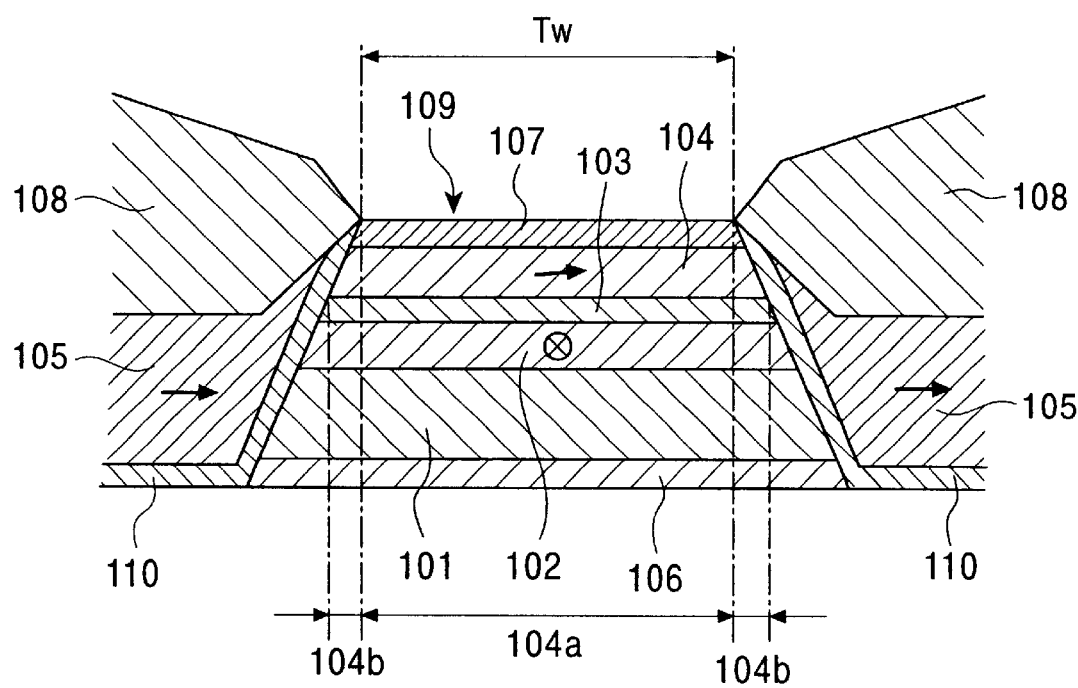
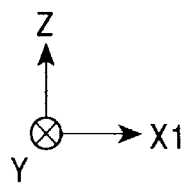

SPIN-VALVE THIN-FILM MAGNETIC ELEMENT WITH A FERROMAGNETIC UNDERLAYER OF HARD BIAS

BACKGROUND OF THE INVENTION

1. Field of the Invention

The present invention relates to a spin-valve thin-film magnetic element in which electrical resistance changes due to the relationship between the pinned magnetization direction of a pinned magnetic layer and the magnetization direction of a free magnetic layer which is influenced by an external magnetic field, to a method for fabricating the same, and to a thin-film magnetic head provided with the spin-valve thin-film magnetic element. More particularly, the invention relates to a technique applicable to a spin-valve thin-film magnetic element, in which the stability of the element is improved, for example, Barkhausen noise is reduced.

2. Description of the Related Art

A spin-valve thin-film magnetic element is one type of giant magnetoresistive (GMR) element exhibiting a giant magnetoresistance effect, which detects a recorded magnetic field from a recording medium, such as a hard disk.

The spin-valve thin-film magnetic element has a relatively simple structure compared to other GMR elements, and has a high rate of resistance change relative to changes in an external magnetic field, and thus the resistance changes in response to a weak magnetic field.

FIG. 15 is a sectional view of a conventional spin-valve thin-film magnetic element, viewed from a surface (air bearing surface; ABS) facing a recording medium.

The spin-valve thin-film magnetic element shown in FIG. 15 is a so-called "bottom-type" single spin-valve thin-film magnetic element in which an underlying layer 106, an antiferromagnetic layer 101, a pinned magnetic layer 102, a nonmagnetic conductive layer 103, a free magnetic layer 104, and a protective layer 107 are formed in that order on a substrate.

For the spin-valve thin-film magnetic element, a magnetic recording medium, such as a hard disk, travels in the Z direction in the drawing, and a fringing magnetic field from the magnetic recording medium is directed in the Y direction.

The conventional spin-valve thin-film magnetic element shown in FIG. 15 includes a laminate 109 in which the underlying layer 106, the antiferromagnetic layer 101, the pinned magnetic layer 102, the nonmagnetic conductive layer 103, the free magnetic layer 104, and the protective layer 107 are deposited in that order on the substrate; bias layers 105 formed on both sides of the laminate 109 with bias underlying layers 110 therebetween; and electrode layers 108 formed on the bias layers 105.

The underlying layer 106 is composed of Ta or the like, and the antiferromagnetic layer 101 is composed of an Ni—O alloy, an Fe—Mn alloy, an Ni—Mn alloy, or the like. The pinned magnetic layer 102 and the free magnetic layer 104 are composed of Co, a Co—Fe alloy, an Fe—Ni alloy, or the like, the nonmagnetic conductive layer 103 is composed of Cu or the like, the bias layers 105 are composed of a Co—Pt alloy or the like, the bias underlying layer 110 is composed of Cr or the like, and the electrode layers 108 are composed of Cu or the like.

Since the pinned magnetic layer 102 is formed in contact with the antiferromagnetic layer 101, an exchange coupling magnetic field (exchange anisotropic magnetic field) is produced at the interface between the pinned magnetic layer 102 and the antiferromagnetic layer 101, and the pinned magnetization of the pinned magnetic layer 102 is pinned, for example, in the Y direction in the drawing.

Since the bias layers 105 are magnetized in the X1 direction in the drawing, the variable magnetization of the free magnetic layer 104 is aligned in the X1 direction. Thereby, the variable magnetization of the free magnetic layer 104 and the pinned magnetization of the pinned magnetic layer 102 are perpendicular to each other.

In the spin-valve thin-film magnetic element, a sensing current is applied from the electrode layers 108 formed on the bias layers 105 to the free magnetic layer 104, the nonmagnetic conductive layer 103, and the pinned magnetic layer 102. A magnetic recording medium, such as a hard disk, travels in the Z direction in the drawing, and when a fringing magnetic field from the magnetic recording medium is applied in the Y direction, the magnetization direction of the free magnetic layer 104 is rotated from the X1 direction to the Y direction. Due to the relationship between the varied magnetization direction of the free magnetic layer 104 and the pinned magnetization direction of the pinned magnetic layer 102, the electrical resistance changes, which is referred to as a magnetoresistance (MR) effect, and the fringing magnetic field from the magnetic recording medium is detected by a voltage change based on the change in the electrical resistance.

The central section sandwiched between the electrode layers 108 corresponds to a sensitive region 104a which substantially contributes to reading of the recorded magnetic field from the magnetic recording medium, and exhibits the magnetoresistance effect, and which also defines the detection track width Tw. Both end sections of the free magnetic layer 104 correspond to insensitive regions 104b which do not greatly contribute to reading of the recorded magnetic field from the magnetic recording medium.

FIG. 16 is a sectional view of another conventional spin-valve thin-film magnetic element, viewed from a surface (ABS) facing a recording medium.

The spin-valve thin-film magnetic element shown in FIG. 16 is a so-called "top-type" single spin-valve thin-film magnetic element in which a protective layer 117, an antiferromagnetic layer 111, a pinned magnetic layer 112, a nonmagnetic conductive layer 113, a free magnetic layer 114, and an underlying layer 116 are deposited in a manner similar to that of the bottom-type single spin-valve thin-film magnetic element described above, but in reversed order.

For the spin-valve thin-film magnetic element, a magnetic recording medium, such as a hard disk, travels in the Z direction in the drawing, and a fringing magnetic field from the magnetic recording medium is directed in the Y direction.

As shown in FIG. 16, the free magnetic layer 114 is formed on the underlying layer 116, the nonmagnetic conductive layer 113 is formed on the free magnetic layer 114, the pinned magnetic layer 112 is formed on the nonmagnetic conductive layer 113, and the antiferromagnetic layer 111 is formed on the pinned magnetic layer 112. The protective layer 117 is formed further on the antiferromagnetic layer 111.

Reference numeral 120 represents a bias underlying layer, reference numeral 115 represents a bias layer, reference numeral 118 represents an electrode layer, and reference numeral 119 represents a laminate.

In the spin-valve thin-film magnetic element, the magnetization direction of the pinned magnetic layer 112 is pinned in a direction opposite to the Y direction.

The underlying layer 116 is composed of Ta or the like, the antiferromagnetic layer 111 is composed of an Ni—O alloy, an Fe—Mn alloy, an Ni—Mn alloy, or the like. The pinned magnetic layer 112 and the free magnetic layer 114 are composed of Co, an Co—Fe alloy, an Fe—Ni alloy, or the like, the nonmagnetic conductive layer 113 is composed of Cu or the like, the bias layers 115 are composed of a Co—Pt alloy or the like, the bias underlying layers 120 are composed of Cr or the like, and the electrode layers 118 are composed of Cu or the like.

The electrode layers 118 are formed on the bias layers 115, and the central section sandwiched between the electrode layers 118 corresponds to a sensitive region 114a which substantially contributes to reading of the recorded magnetic field from the magnetic recording medium, and exhibits the magnetoresistance effect, and which also defines the detection track width Tw. Both end sections other than the central section sandwiched between the electrode layers correspond to insensitive regions 114b which do not greatly contribute to reading of the recorded magnetic field from the magnetic recording medium.

A sensing current is applied from the electrode layers 118 to the pinned magnetic layer 112, the nonmagnetic conductive layer 113, and the free magnetic layer 114 in the laminate 119 of the spin-valve thin-film magnetic element in a similar manner to that of the element shown in FIG. 15.

A magnetic recording medium, such as a hard disk, travels in the Z direction in the drawing, and when a fringing magnetic field from the magnetic recording medium is applied in the Y direction, the magnetization direction of the free magnetic layer 114 is rotated from the X1 direction to the Y direction. Due to the relationship between the varied magnetization direction of the free magnetic layer 114 and the pinned magnetization direction of the pinned magnetic layer 112, the electrical resistance changes, which is referred to as an MR effect, and the fringing magnetic field from the magnetic recording medium is detected by a voltage change based on the change in the electrical resistance.

As the recording density has been increased in magnetic recording media, attempts have been made to decrease the recording track width and to decrease the distance between the adjacent recording tracks. When track narrowing is performed by decreasing the recording track width, side reading occurs, in which the insensitive regions 104b or 114b read information in the magnetic recording tracks adjacent to the magnetic recording track that is read by the sensitive region, and the side reading causes noise in output signals, resulting in an error.

The bias layer 105 or 115 in FIG. 15 or 16 is magnetized in the X1 direction due to the coercive force ($H_c$), since the thickness of the bias layer 105 or 115 is small in the vicinity of the laminate 109 or 119, it is difficult to apply a sufficient bias magnetic field to the free magnetic layer 104 or 114 in the X1 direction. Therefore, the magnetization direction of the free magnetic layer 104 or 114 is not easily stabilized in the X1 direction, resulting in Barkhausen noise.

In order to cope with the problems described above, in the spin-valve thin-film magnetic element shown in FIG. 15 or 16, the bias underlying layer 110 or 120 composed of a Cr film having a body-centered cubic (bcc) structure is provided between a substrate which is not shown in the drawing and the bias layer 105 or 115. The bias underlying layer 110 or 120 acts as a buffer film and an alignment film. As the buffer film, the bias underlying layer 110 or 120 functions as a diffusion barrier when the substrate is exposed to high temperatures due to the subsequent insulating resist hardening step (UV cure or hard bake), etc. in the fabrication process of an inductive head (write head), and the magnetic properties of the bias layer 105 or 115 are prevented from being degraded due to thermal diffusion between the bias layer 105 or 115 and the peripheral layers. With respect to the function as the alignment film, Cr constituting the bias underlying layer 110 or 120 has the bcc structure. The Co—Pt alloy constituting the bias layer 105 or 115 has a mixture of a face-centered cubic (fcc) structure and a hexagonal close-packed (hcp) structure, in which the lattice constant is close to that of Cr. Therefore, in the Co—Pt alloy, the fcc structure is not easily formed, and the hcp structure is easily formed. Consequently, the c-axis of the hcp structure grows while being oriented by priority within the boundary between the Co—Pt alloy and Cr.

Since the hcp structure has a larger magnetic anisotropy in the c-axis direction in comparison with the fcc structure, when a magnetic field is applied to the bias layer 105 or 115, the coercive force ($H_c$) is further increased. Moreover, since the c-axis of the hcp structure is oriented by priority within the boundary between the Co—Pt alloy and Cr, the remanence ($B_r$) is increased, and the remanence ratio S, which is the ratio of the remanence ($B_r$) to the saturation magnetic flux density ($B_s$), is also increased. Consequently, the bias magnetic field produced by the bias layer 105 or 115 can be increased, and thus the free magnetic layer 104 or 114 is easily aligned in a single-domain state.

The strong bias magnetic field directed in the X1 direction from the bias layer 105 or 115 is applied to the free magnetic layer 104 or 114 and the magnetization of the free magnetic layer 104 or 114 is aligned in a single-domain state in the X1 direction, and thus Barkhausen noise does not easily occur.

A magnetic head provided with such a thin-film magnetic element can detect a minute change in the magnetic intensity, and thus it is possible to improve the accuracy in write/read into and from a recording medium.

Recently, as the recording density is further improved, the track width of a read element must be further decreased. If narrowing of the track proceeds, since the demagnetizing field in the free magnetic layer in a spin-valve laminate is increased, the bias magnetic field from the bias layer is not effectively applied to the free magnetic layer. Consequently, the magnetic domain is insufficiently controlled, resulting in Barkhausen noise. As described above, as the recording density is increased, the demagnetizing field in the track width direction increases, and there is an increased difficulty in controlling the magnetic domain in order to remove Barkhausen noise. Herein, the demagnetizing field is defined as a magnetic field in which the magnetization direction is opposite to the magnetization direction of magnetic charge accumulated in the edges in the magnetization direction of the free magnetic layer which is a ferromagnetic film.

Therefore, in order to improve the recording density, the demagnetizing field must be decreased, and in order to decrease the demagnetizing field, magnetic charge must be prevented from appearing in the edges of the free magnetic layer magnetized in the track width direction. For that purpose, the bias layer having a larger saturation magnetization than that of the free magnetic layer may be used, and the magnetic field of the bias layer may be effectively applied to the free magnetic layer so that the magnetic charge at the edges of the free magnetic layer is effectively removed. However, the saturation magnetization of a metal layer used for the bias layer is generally small. Although it is may be conceived that the saturation magnetization is increased by using a bias layer having a small saturation magnetization and by increasing the thickness of the bias layer, the idea goes against the trend toward miniaturized elements.

SUMMARY OF THE INVENTION

It is an object of the present invention to provide a spin-valve thin-film magnetic element in which a high coercive force ($H_c$) is secured even in a bias layer composed of a material having low saturation magnetization, and the stability in the magnetosensitive region of a free magnetic layer can be secured.

It is another object of the present invention to provide a method for fabricating such a spin-valve thin-film magnetic element having superior stability in the magnetosensitive region of the free magnetic layer.

It is another object of the present invention to provide a thin-film magnetic head using such a spin-valve thin-film magnetic element having superior stability in the magnetosensitive region of the free magnetic layer, in which Barkhausen noise is reduced and stable operation can be achieved.

In order to overcome the problems associated with the conventional spin-valve thin-film magnetic elements, in the present invention, bias underlying layers are composed of Fe or an Fe—Co alloy and the thickness of the bias underlying layers is set at 1.6 to 4.3 nm so that the coercive force of bias layers is increased, and thus a bias magnetic field is effectively applied to the free magnetic layer, the occurrence of a demagnetizing field in the free magnetic layer is inhibited, and the magnetosensitive region is stabilized.

In one aspect of the present invention, a spin-valve thin-film magnetic element includes a laminate formed on a substrate, the laminate including at least an antiferromagnetic layer, a pinned magnetic layer in contact with the antiferromagnetic layer, a nonmagnetic conductive layer in contact with the pinned magnetic layer, and a free magnetic layer in contact with the nonmagnetic conductive layer; bias layers formed on both sides in the track-width direction of the laminate; and electrode layers formed on the bias layers. The bias layers are formed on both sides of the laminate and extend over the peripheral sections of the laminate with ferromagnetic bias underlying layers therebetween, the bias underlying layers being composed of Fe or an Fe—Co alloy and having a thickness of 1.6 to 4.3 nm.

In another aspect of the present invention, a spin-valve thin-film magnetic element includes a laminate including a nonmagnetic underlying layer in contact with a substrate, a free magnetic layer in contact with the underlying layer, a nonmagnetic conductive layer in contact with the free magnetic layer, a pinned magnetic layer in contact with the nonmagnetic conductive layer, and an antiferromagnetic layer in contact with the pinned magnetic layer; bias layers formed on both sides in the track-width direction of the laminate; and electrode layers formed on the bias layers. The bias layers are formed on both sides of the laminate and extend over the peripheral sections of the laminate with ferromagnetic bias underlying layers therebetween, the bias underlying layers being composed of Fe or an Fe—Co alloy and having a thickness of 1.6 to 4.3 nm.

By using Fe or an Fe—Co alloy having a high saturation magnetization with the bcc structure as the bias underlying layer, the bias layer composed of a Pt—Co alloy can have a high coercive force ($H_c$). Moreover, by limiting the thickness of the bias underlying layer composed of Fe or the Fe—Co alloy to a predetermined range, the coercive force ($H_c$) of the bias layer can be maximized.

Consequently, an increase in the demagnetizing field in the track-width direction of the magnetic element is prevented, and the magnetic domain is easily controlled, thus, Barkhausen noise is suppressed, and the stability of the head can be secured.

The structure of the spin-valve thin-film magnetic element of the present invention will now be described.

In one type of layered structure constituting the magnetosensitive region of the spin-valve thin-film magnetic element, a laminate is formed on a substrate, the laminate including an antiferromagnetic layer, a pinned magnetic layer formed in contact with the antiferromagnetic layer, and a free magnetic layer formed on the pinned magnetic layer with a nonmagnetic conductive layer therebetween; bias layers are formed on both sides in the track-width direction of the laminate; and electrode layers are formed on the bias layers. By forming a bottom type laminate in which deposition is performed in the order as described above, the proportion of a sensing current applied to the laminate, without being passed through the antiferromagnetic layer which has a high resistivity, can be improved, and thus side reading can be prevented, and it is possible to cope with higher magnetic recording densities.

In another type of layered structure constituting the magnetosensitive region of the spin-valve thin-film magnetic element, a laminate includes a nonmagnetic underlying layer formed on a substrate, a free magnetic layer formed such that it is in contact with the underlying layer, a pinned magnetic layer formed on the free magnetic layer with a nonmagnetic conductive layer therebetween, and an antiferromagnetic layer formed on the pinned magnetic layer; bias layers are formed on both sides in the track-width direction of the laminate; and electrode layers are formed on the bias layers. By forming a top-type laminate in which deposition is performed in the order described above, it is possible to increase the proportion of the sensing current directly applied to the pinned magnetic layer, the nonmagnetic conductive layer, and the free magnetic layer located below the antiferromagnetic layer through the bias layers.

In the spin-valve thin-film magnetic element of the present invention, the antiferromagnetic layer is preferably composed of a Pt—Mn alloy. Instead of the Pt—Mn alloy, the antiferromagnetic layer may be composed of one of an X—Mn alloy and a Pt—Mn—X' alloy, where X is an element selected from the group consisting of Pd, Ir, Rh, Ru, and Os, and X' is at least one element selected from the group consisting of Pd, Cr, Ru, Ni, Ir, Rh, Os, Au, Ag, Ne, Ar, Xe, and Kr. Furthermore, an Ni—O alloy, an Fe—Mn alloy, an Ni—Mn alloy, or the like may be used as the antiferromagnetic layer.

By fabricating the spin-valve thin-film magnetic element in which the antiferromagnetic layer is composed of an X—Mn alloy or an X'—Pt—Mn alloy, a larger exchange coupling magnetic field can be applied by the antiferromagnetic layer, and superior characteristics, such as a high blocking temperature and superior corrosion resistance, are exhibited.

In the spin-valve thin-film magnetic element of the present invention, since the pinned magnetic layer is formed in contact with the antiferromagnetic layer, an exchange coupling magnetic field (exchange anisotropic magnetic field) is produced at the interface between the pinned magnetic layer and the antiferromagnetic layer, and the pinned magnetization is pinned in a certain direction.

The pinned magnetic layer is composed of a ferromagnetic material, such as Co, an Ni—Fe alloy, a Co—Ni—Fe alloy, a Co—Fe alloy, or a Co—Ni alloy, and preferably has a thickness of 2 to 4 nm.

In the spin-valve thin-film magnetic element of the present invention, the nonmagnetic conductive layer is composed of a nonmagnetic metal, such as Cu, Cr, Au, Ag, Rh, or Ir, and usually has a thickness of 2 to 4 nm. The nonmagnetic conductive layer allows spin-dependent scattering of conduction electrons to occur at the interface between the ferromagnetic pinned magnetic layer and the free magnetic layer, resulting in a giant magnetoresistance effect (GMR effect).

In the spin-valve thin-film magnetic element of the present invention, the free magnetic layer is composed of a ferromagnetic material, such as Co, an Ni—Fe alloy, a Co—Ni—Fe alloy, a Co—Fe alloy, or a Co—Ni alloy, similar to the pinned magnetic layer.

When a fringing magnetic field is applied from a recording medium to the free magnetic layer, the magnetization of the free magnetic layer changes, spin-dependent scattering of conduction electrons occurs at the interface with the nonmagnetic conductive layer and at the interface between the nonmagnetic conductive layer and the pinned magnetic layer, resulting in a change in electrical resistance, and the fringing magnetic field from the recording medium is thereby detected.

As described above, the antiferromagnetic layer, the pinned magnetic layer, the nonmagnetic conductive layer, and the free magnetic layer are disposed on the substrate, and a protective layer composed of a nonmagnetic metal, such as Ta, is provided thereon, and thus a laminate constituting the magnetosensitive region is obtained.

The laminate is then subjected to ion milling or the like, which will be described below, to produce a substantially trapezoidal cross-section. Bias layers are provided on both sides of the trapezoidal laminate, and conductive layers are provided on the bias layers.

The bias layers effectively apply a bias magnetic field to the free magnetic layer so that the demagnetizing field is suppressed in the free magnetic layer and the free magnetic layer is aligned in a single-domain state, and thus Barkhausen noise is suppressed, enabling stable operation of the magnetosensitive region. For that purpose, the bias layers preferably have as large a saturation magnetization as possible.

Preferably, the bias layers are composed of a Co—Pt alloy, a Co—Cr—Pt alloy, a Co—Cr—Ta alloy, or the like, and have a thickness of approximately 20 to 50 nm.

At least one bias layer is formed on each inclined side of the trapezoidal laminate, and the bias magnetic field is applied from the side of the laminate. The bias layers also extend over the peripheral sections of the laminate.

In the present invention, in order to increase the coercive force of the bias layers and to effectively apply the bias magnetic field to the free magnetic layer, a ferromagnetic material, such as Fe or an Fe—Co alloy, is used as the bias underlying layer, instead of the conventionally used Cr, and the thickness thereof is set at 1.6 to 4.3 nm.

The Co—Pt alloy preferably used as the bias layer has a mixture of a face-centered cubic (fcc) structure and a hexagonal close-packed (hcp) structure, which resembles a body-centered cubic (bcc) structure. The Fe or Fe—Co alloy used as the bias underlying layer has a body-centered cubic (bcc) structure, and the lattice constant thereof is close to that of the Co—Pt alloy. The Fe or Fe—Co alloy has a higher saturation magnetization than that of the Co—Pt alloy used as the bias layer. Therefore, by depositing the Co—Pt alloy using the Fe or the Fe—Co alloy as the bias underlying layer, the coercive force of the bias layer can be increased. Incidentally, example values of the coercive force $H_c$ (Oe) and the saturation magnetization $M_s$ (emu/cc) in Fe—Co alloys having different Co contents are $H_c$=30 Oe and $M_s$=1,875 emu/cc in $Fe_{50}$—$Co_{50}$ alloy, Hc=19 Oe and $M_s$=1,600 emu/cc in $Fe_{85}$—$Co_{15}$ alloy, and $H_c$=20 Oe and $M_s$=1,425 emu/cc in $Fe_{95}$—$Co_5$ alloy.

It has been found that when the thickness of the Fe or Fe—Co alloy as the bias underlying layer is 2.0 nm, the coercive force of the Co—Pt alloy as the bias layer is at a maximum. FIG. 1 is a graph showing the relationship between the coercive force of the Co—Pt alloy and the thickness of the Fe—Co alloy underlying film. FIG. 1 shows the change in the coercive force ($H_c$) as the Co—Pt alloy is deposited in the direction of the Fe—Co alloy orientation. The coercive force of the Fe—Co/Co—Pt alloy laminate rapidly increases as the thickness of the Fe—Co alloy film approaches 1.0 nm, and reaches its highest value, exceeding 1,000 Oe, when the thickness of the Fe—Co alloy film is 2.0 nm. After that, as the thickness of the Fe—Co alloy film is increased, the coercive force gradually decreases.

Since the most desirable value of the coercive force of the bias layer is 750 Oe or more, the preferred thickness of the bias underlying layer is 1.6 to 4.3 nm. As shown in FIG. 1, when the thickness of the Fe—Co alloy is less than 2.0 nm, the coercive force of the Fe—Co/Co—Pt alloy laminate rapidly decreases with thickness, and therefore, when the Fe—Co alloy bias underlying layer is formed, the thickness must be controlled so as not to greatly fall below 2.0 nm. For example, if the thickness of the Fe—Co alloy bias underlying layer is set at 1.7 to 3.5 nm, it is possible to maintain the coercive force of the Fe—Co/Co—Pt alloy laminate bias layer above 750 Oe, and if the thickness of the Fe—Co alloy bias underlying layer is set at 1.8 to 2.5 nm, it is possible to maintain the coercive force of the Fe—Co/Co—Pt alloy laminate bias layer above 850 Oe.

As described above, the coercive force of the Fe—Co/Co—Pt laminate bias layer changes significantly with thickness being greatest when the thickness of the Fe—Co alloy bias underlying layer is 2.0 nm. Moreover, when the thickness of the Fe—Co alloy bias underlying layer is decreased below 2.0 nm, the coercive force rapidly decreases. In order to effectively apply the bias magnetic field to the free magnetic layer, the thickness of the bias underlying layers, which are adjacent to the free magnetic layer, on both sides in the track-width direction of the laminate is preferably more than or equal to the thickness of the bias underlying layers extending over the peripheral sections other than the both sides in the track-width direction of the laminate. Since most of the bias underlying layers extend over the peripheral sections of the laminate, it is also important to increase the coercive force of the bias underlying layers extending over the peripheral sections of the laminate. Therefore, the thickness of the bias underlying layers is set so that the thickness of the bias underlying layers on both sides in the track-width direction of the laminate is larger than or equal to the thickness of the bias layers extending over the peripheral sections of the laminate, within the range of 1.6 to 4.3 nm.

The bias underlying layers in which the thickness is thus controlled may be formed, for example, by any one of ion-beam sputtering, long-throw sputtering, and collimation sputtering, or by a method in which these are combined, which will be described in detail below.

The conductive layers disposed on the bias layers apply a sensing current to the free magnetic layer, the nonmagnetic conductive layer, and the pinned magnetic layer. The conductive layers are composed of a highly conductive metal, such as Cr, Ta, or Au.

In the present invention, the pinned magnetic layer may include a first pinned magnetic sublayer in which the magnetization direction is pinned due to an exchange anisotropic magnetic field with the antiferromagnetic layer, and a second pinned magnetic sublayer formed on the first pinned magnetic sublayer with a nonmagnetic intermediate layer therebetween, the magnetization direction of the second pinned magnetic sublayer being aligned antiparallel to the magnetization direction of the first pinned magnetic sublayer.

In the spin-valve thin-film magnetic element, the first pinned magnetic sublayer is provided on the antiferromagnetic layer side of the nonmagnetic intermediate layer, and the second pinned magnetic sublayer is provided on the nonmagnetic conductive layer side of the nonmagnetic intermediate layer.

The first pinned magnetic sublayer and the second pinned magnetic sublayer are composed of a ferromagnetic material, such as Co, an Ni—Fe alloy, or an Fe—Co alloy. The nonmagnetic intermediate layer is composed of a nonmagnetic material, such as Ru.

At the interface between the first pinned magnetic sublayer and the antiferromagnetic layer, an exchange coupling magnetic field (exchange anisotropic magnetic field) is produced and the magnetization of the first pinned magnetic sublayer is pinned in a certain direction. The second pinned magnetic sublayer is antiferromagnetically coupled to the first pinned magnetic sublayer, and the magnetization of the second pinned magnetic sublayer is pinned in a direction opposite to that of the first pinned magnetic sublayer.

Since the magnetization directions of the first pinned magnetic sublayer and the second pinned magnetic sublayer are antiparallel to each other, the magnetic moments of the first pinned magnetic sublayer and the second pinned magnetic sublayer cancel out each other. However, when the thickness of the first pinned magnetic sublayer is larger than the thickness of the second pinned magnetic sublayer, the spontaneous magnetization resulting from the first pinned magnetic sublayer slightly remains, and thus the pinned magnetic layer is in a ferrimagnetic state. The exchange coupling magnetic field with the antiferromagnetic layer is further amplified by the apparent spontaneous magnetization, and the magnetization of the pinned magnetic layer is pinned.

In the present invention, preferably, the laminate further includes a nonmagnetic underlying layer deposited as an undermost layer and a nonmagnetic protective layer deposited as an uppermost layer, and the free magnetic layer may include a first free magnetic sublayer and a second free magnetic sublayer separated by a nonmagnetic intermediate layer, the first free magnetic sublayer being disposed on the nonmagnetic protective layer or the nonmagnetic underlying layer side, and the second free magnetic sublayer being disposed on the nonmagnetic conductive layer side.

In the free magnetic layer of the spin-valve thin-film magnetic element, for example, the first free magnetic sublayer is provided on the protective layer side of the nonmagnetic intermediate layer, and the second free magnetic sublayer is provided on the nonmagnetic conductive layer side of the nonmagnetic intermediate layer.

The first free magnetic sublayer and the second free magnetic sublayer are composed of a ferromagnetic material, such as an Ni—Fe alloy, and the nonmagnetic intermediate layer is composed of a nonmagnetic material, such as Ru.

The thickness $t_1$ of the first free magnetic sublayer is set smaller than the thickness $t_2$ of the second free magnetic sublayer.

When the saturation magnetization of the first free magnetic sublayer and the saturation magnetization of the second free magnetic sublayer are set at $M_1$ and $M_2$, respectively, the magnetic thickness of the first free magnetic sublayer and the magnetic thickness of the second free magnetic sublayer are $M_1 \cdot t_1$ and $M_2 \cdot t_2$, respectively, and the magnetic thicknesses of the first free magnetic sublayer and the second free magnetic sublayer are set so as to satisfy the relationship, $M_2 \cdot t_2 > M_1 \cdot t_1$. The first free magnetic sublayer and the second free magnetic sublayer are antiferromagnetically couplable to each other. That is, when the magnetization direction of the first free magnetic sublayer is determined by the bias layer, the magnetization direction of the second free magnetic sublayer is aligned in a direction opposite to the magnetization direction of the first free magnetic layer. Since the relationship $M_2 \cdot t_2 > M_1 \cdot t_1$ is satisfied, the magnetization of the second free magnetic sublayer remains, and the magnetization direction of the entire free magnetic layer is aligned in the magnetization direction of the sublayer having a larger magnetic thickness. At this stage, the effective magnetic thickness of the free magnetic layer is expressed as $(M_2 \cdot t_2 - M_1 \cdot t_1)$.

As described above, the first free magnetic sublayer and the second free magnetic sublayer are antiferromagnetically coupled to each other so that the magnetization directions are antiparallel to each other, and the magnetic thicknesses of the two sublayers satisfy the relationship $M_2 \cdot t_2 > M_1 \cdot T_1$, and thus a synthetic ferrimagnetic state is formed. Consequently, the magnetization direction of the free magnetic layer and the magnetization direction of the pinned magnetic layer are perpendicular to each other.

In the spin-valve thin-film magnetic element, when the magnetization direction of the free magnetic layer changes due to a fringing magnetic field from a recording medium, such as a hard disk, the electrical resistance changes due to the relationship with the magnetization of the pinned magnetic layer, and the fringing magnetic field from the recording medium is detected by voltage change caused by the change in the electrical resistance.

Since the free magnetic layer includes the first and second free magnetic sublayers antiferromagnetically coupled to each other, the magnetization direction of the entire free magnetic layer is varied by a small external magnetic field, and thus the sensitivity of the spin-valve thin-film magnetic element is improved.

If the spin-valve thin-film magnetic element of the present invention as described above is used for a magnetic head, the bias magnetic field is effectively applied to the free magnetic layer, an increase of the demagnetizing field in the free magnetic layer of the spin-valve laminate is inhibited, and the magnetic charge in the edges of the free magnetic layer can be effectively removed, and thus the free magnetic layer is completely aligned in a single-domain state. Consequently, it is possible to provide a thin-film magnetic head, which is suitable for track narrowing of the read element which is associated with further improvement in recording density, and in which Barkhausen noise is reduced and stable operation can be achieved.

In another aspect of the present invention, a method for fabricating a spin-valve thin-film magnetic element includes the steps of:

forming a laminate by depositing, at least, an antiferromagnetic layer, a pinned magnetic layer in contact with the antiferromagnetic layer, a nonmagnetic conductive layer in contact with the pinned magnetic layer, and a free magnetic layer in contact with the nonmagnetic conductive layer in that order on a substrate;

forming a lift-off resist layer on the laminate;

removing the region which is not covered with the lift-off resist layer by ion milling so that the laminate has a trapezoidal cross-section;

forming bias underlying layers by performing sputtering on both inclined sides of the laminate and over the peripheral sections of the laminate while a sputtering target comprising Fe or an Fe—Co alloy is opposed to the substrate at a predetermined angle so that the thickness of the bias underlying layers on the inclined sides of the laminate is equal to or larger than the thickness of the bias underlying layers over the peripheral sections of the laminate;

forming bias layers on the bias underlying layers by sputtering; and forming electrode layers on the bias layers by sputtering.

Alternatively, the laminate is formed by depositing, at least, a free magnetic layer, a nonmagnetic conductive layer in contact with the free magnetic layer, a pinned magnetic layer in contact with the nonmagnetic conductive layer, and an antiferromagnetic layer in contact with the pinned magnetic layer in that order on a substrate.

In the method for fabricating the spin-valve thin-film magnetic element of the present invention, in the step of forming the laminate, a so-called synthetic-ferri-pinned type pinned magnetic layer may be formed, which pinned magnetic layer including a first pinned magnetic sublayer and a second pinned magnetic sublayer formed on the first pinned magnetic sublayer with a nonmagnetic intermediate layer therebetween.

In the method for fabricating the spin-valve thin-film magnetic element of the present invention, in the step of forming the laminate, a so-called synthetic-ferri-free type free magnetic layer may be formed, which free magnetic layer including a first free magnetic sublayer and a second free magnetic sublayer separated by a nonmagnetic intermediate layer, the first free magnetic sublayer being disposed on the nonmagnetic protective layer or nonmagnetic underlying layer side, and the second free magnetic sublayer being disposed on the nonmagnetic conductive layer side.

In the step of forming the laminate, the individual layers are deposited on the substrate or an underlying layer provided on the substrate by sputtering to achieve predetermined thicknesses.

Next, on the surface of the laminate thus formed, a lift-off resist pattern with a predetermined size is formed. After the laminate has been provided with the resist pattern, a portion other than the shadow portion of the resist pattern is removed by etching, such as ion milling, and a substantially trapezoidal laminate is obtained.

Next, the bias underlying layers are formed by any one of ion-beam sputtering, long-throw sputtering, and collimation sputtering, or by a method in which these are combined. In the present invention, it is important to accurately control the thicknesses of the bias underlying layers composed of Fe or the Fe—Co alloy. In view of this, preferably, any one of ion-beam sputtering, long-throw sputtering, and collimation sputtering in which the irradiation direction of sputtered particles can be limited to a narrow range is used. When such a sputtering method is carried out, a sputtering target composed of Fe or the Fe—Co alloy for forming the bias underlying layers is positioned at an angle to the substrate provided with the trapezoidal laminate, the angle is appropriately set, and sputtered particles are accurately deposited on the intended section, and thus the bias underlying layers with desired thicknesses can be obtained. Moreover, it is also possible to make the thickness of the bias underlying layers on the sides in the track-width direction of the laminate larger than the thickness of the bias underlying layers extending over the peripheries of the laminate.

When the bias underlying layers are deposited, preferably, the substrate is rotated so that the bias underlying layers are uniformly deposited.

By appropriately setting the angle of incidence of sputtered particles to the substrate, namely, the deposition angle ($\theta$), it is possible to control the thickness of the bias underlying layers accurately and at a predetermined thickness. Therefore, the setting of the deposition angle ($\theta$) is important.

Usually, the angle ($\alpha$) between the substrate and the inclined surface of the laminate is approximately 15 to 60 degrees, and preferably 20 to 50 degrees.

When the angle ($\alpha$) between the substrate and the inclined surface of the laminate was changed from 20 to 60 degrees in order to set the thickness (b) of the bias underlying layer formed on the inclined surface of the laminate at 2.0 nm, the ratio (b/a) of the thickness (b) of the bias underlying layer formed on the inclined surface of the laminate to the thickness (a) of the bias underlying layer extending over the peripheral sections of the laminate was examined. FIG. 2 is a graph showing the results thereof.

As is obvious from FIG. 2, it is when the deposition angle ($\theta$) is 7 degrees or more the ratio b/a is equal to 1 while both the thickness (a) of the bias underlying layer extending from the bottom of the inclined surface of the laminate, parallel to the substrate, and the thickness (b) of the bias underlying layer formed on the inclined surface are 2.0 nm.

As described above, when the thickness of the bias underlying layer is below 2.0 nm, the coercive force of the bias layer rapidly decreases, and this is not desirable. Therefore, preferably, both the thickness (a) of the bias underlying layer extending over the peripheries of the laminate and the thickness (b) of the bias underlying layer formed on the inclined surface of the laminate are more than 2.0 nm and are infinitesimally close to 2.0 nm. At this stage, the ratio b/a is preferably greater than 1 and is infinitesimally close to 1.

In view of the coercive force of the bias layer, the permissible thicknesses (a) and (b) of the bias underlying layers are approximately 1.6 to 4.6 nm, and the thickness (b) is desirably 2.0 nm, and therefore, the upper limit of the ratio b/a is 2.15. Most preferably, both the thickness (a) and the thickness (b) are 2.0 nm and the ratio b/a is 1. Consequently, it is apparent from FIG. 2 that in order to obtain a ratio b/a of 1.0 to 2.15, the deposition angle ($\theta$) must be 19 to 70 degrees. However, when the angle ($\alpha$) between the substrate and the inclined surface of the laminate is 60 degrees, the deposition angle ($\theta$) must be 30 degrees or more in order to obtain a ratio b/a of 1 or more. In order for the ratio b/a to be reliably 1 or more, b/a must be in the range of 1 to approximately 1.75, and therefore, the deposition angle is more preferably set in the range from 19 to 48 degrees assuming that the angle ($\alpha$) between the substrate and the inclined surface of the laminate is 20 to 45 degrees.

The substrate provided with the bias underlying layers with predetermined thicknesses is subjected to sputtering again to form the bias layers and the conductive layers, and thus the spin-valve thin-film magnetic element is completed. At this stage, the sputtering targets may be disposed parallel to the substrate.

By constructing a magnetic head using the spin-valve thin-film magnetic element thus obtained, the magnetic head can exhibit high performance even if the track width is narrowed in order to cope with a higher recording density.

BRIEF DESCRIPTION OF THE DRAWINGS

FIG. 15 is a sectional view of a conventional spin-valve thin-film magnetic element, viewed from a surface facing a recording medium;

DESCRIPTION OF THE PREFERRED EMBODIMENTS

First Embodiment

Figure 1:
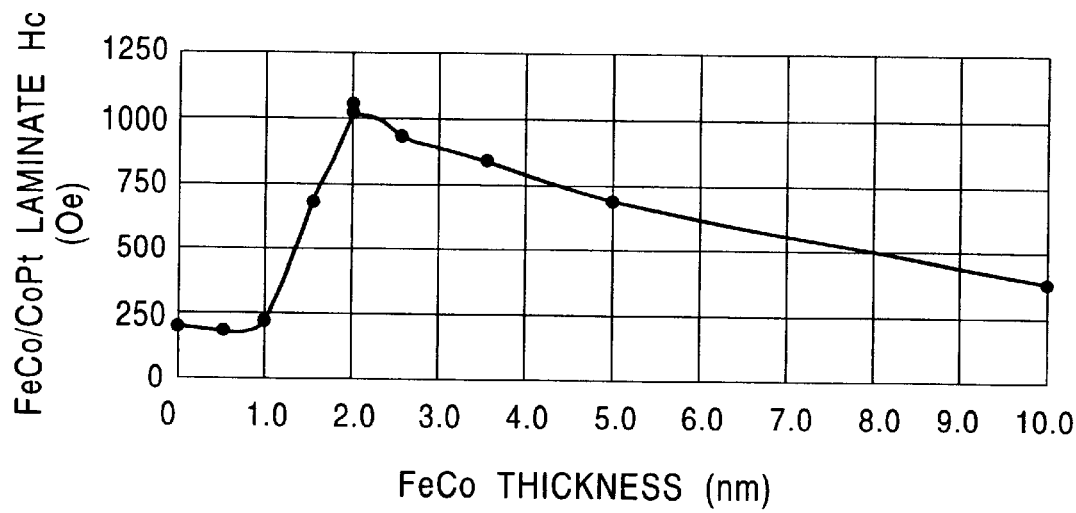
FIG. 1 is a graph showing the relationship between the thickness of the Fe—Co film and the coercive force of the Co—Pt alloy.
Figure 2:
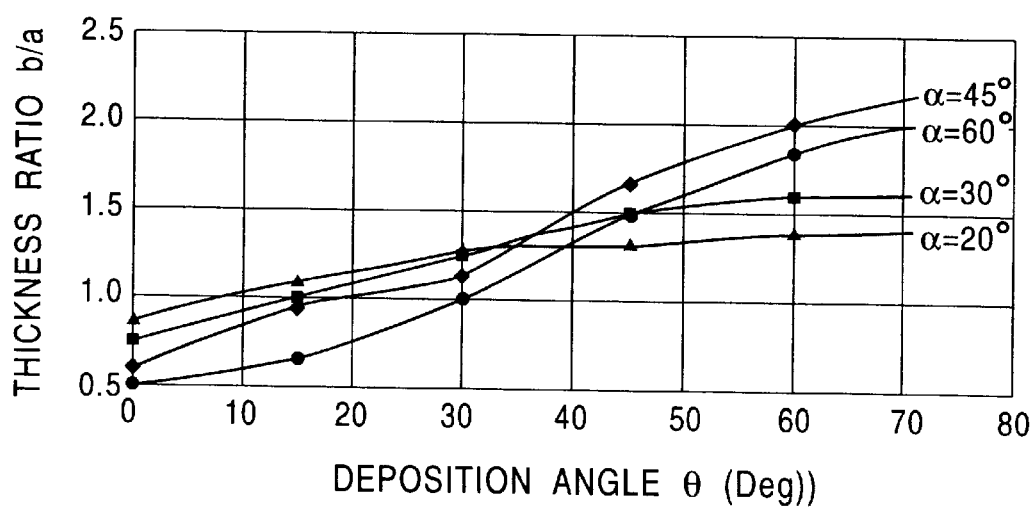
FIG. 2 is a graph showing the relationship between the deposition angle and the thickness ratio.
Figure 3:
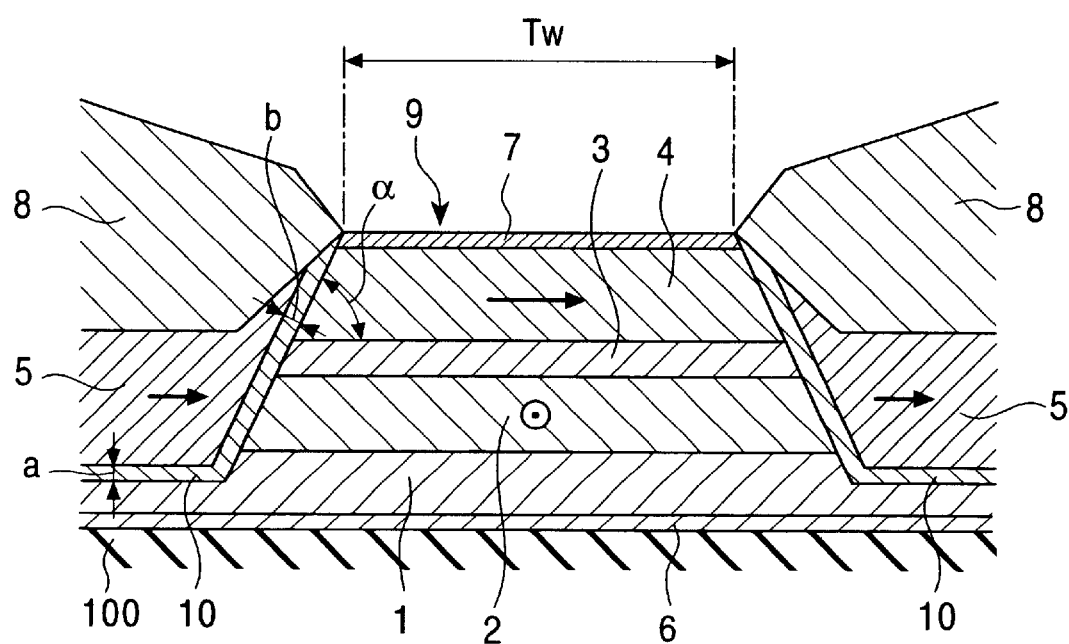
FIG. 3 is a sectional view of a spin-valve thin-film magnetic element in a first embodiment of the present invention, viewed from a surface facing a recording medium.

FIG. 3 is a sectional view of a spin-valve thin-film magnetic element in a first embodiment of the present invention, viewed from a surface facing a recording medium.

The spin-valve thin-film magnetic element in the present invention is a giant magnetoresistive (GMR) element using a giant magnetoresistance effect. The spin-valve thin-film magnetic element is provided on a trailing edge of a floating-type slider in a hard disk drive, etc., and detects a recorded magnetic field from a hard disk, etc., as will be described below. A magnetic recording medium, such as a hard disk, travels in the Z direction in the drawing, and a fringing magnetic field from the magnetic recording medium is directed in the Y direction.

The spin-valve thin-film magnetic element in the first embodiment of the present invention is a so-called "bottom type" in which an underlying layer 6, an antiferromagnetic layer 1, a pinned magnetic layer 2, a nonmagnetic conductive layer 3, a free magnetic layer 4, and a protective layer 7 are formed in that order on a substrate 100.

The antiferromagnetic layer 1 is formed on the substrate 100 with the underlying layer 6 composed of Ta or the like therebetween, and the pinned magnetic layer 2 is formed on the antiferromagnetic layer 2. The nonmagnetic conductive layer 3 composed of Cu or the like is formed on the pinned magnetic layer 2, and the free magnetic layer 4 is formed on the nonmagnetic conductive layer 3.

As shown in FIG. 3, the individual layers from a part of the underlying layer 6 to the protective layer 7 constitute a laminate 9 having a trapezoidal cross-section.

Reference numeral 5 represents a bias layer and reference numeral 8 represents an electrode layer. The principal part of the bias layer 5 is formed on the antiferromagnetic layer 1 extending beyond the periphery of the laminate 9 with a bias underlying layer 10 therebetween, and parts of the bias layers 5 are provided on both sides in the track-width direction of the trapezoidal laminate 9.

By fabricating the bottom-type spin-valve thin-film magnetic element in which the individual layers are deposited in the order described above, it is possible to improve the proportion of the sensing current applied to the laminate 9 without passing through the antiferromagnetic layer 1 having a high resistivity, and therefore, side reading can be avoided.

The bias underlying layers 10 are composed of a ferromagnetic material, such as Fe or an Fe—Co alloy, and have a thickness of 1.6 to 4.3 nm, preferably, 1.8 to 2.5 nm, and more preferably, 1.7 to 3.5 nm. The thickness (b) of the bias underlying layers 10 disposed on both sides of the trapezoidal laminate 9 is equal to or larger than the thickness (a) of the bias underlying layers 10 extending over the antiferromagnetic layer 1, parallel to the substrate 100. Most preferably, both the thickness (a) and the thickness (b) are 2.0 nm. In order to facilitate the control of film thickness, both the thickness (a) and the thickness (b) are set in the range from 1.6 to 4.3 nm, and the thickness (b) is set to be larger. For example, preferably, the ratio b/a is set in the range from 1 to 1.25. By setting the ratio b/a at 1 or more, it is possible to increase the coercive force of a Co—Pt alloy constituting the bias layers 5 to 750 Oe or more, and thus a bias magnetic field can be effectively applied to the free magnetic layer 4. Consequently, the free magnetic layer can be satisfactorily aligned in a single-domain state, and it is possible to obtain a spin-valve thin-film magnetic element having superior stability in which. Barkhausen noise is reduced.

The spin-valve thin-film magnetic element of the present invention will be described in more detail. In the spin-valve thin-film magnetic element in the first embodiment of the present invention, preferably, the antiferromagnetic layer 1 has a thickness of approximately 8 to 11 nm in the center of the laminate 9, and is composed of a Pt—Mn alloy. The Pt—Mn alloy has superior corrosion resistance, a higher blocking temperature, and a larger exchange coupling magnetic field (exchange anisotropic magnetic field) in comparison with the Ni—Mn alloy or Fe—Mn alloy which has been conventionally used as the antiferromagnetic layer.

Instead of the Pt—Mn alloy, the antiferromagnetic layer 1 may be composed of an X—Mn alloy, where X is an element selected from the group consisting of Pd, Ru, Ir, Rh, and Os, or an X'—Pt—Mn alloy, where X' is at least one element selected from the group consisting of Pd, Ru, Ir, Rh, Os, Au, Ag, Cr, Ni, Ar, Ne, Xe, and Kr.

In the Pt—Mn alloy and the X—Mn alloy, the Pt content or the X content is preferably in the range from 37 to 63 atomic %, and more preferably, 47 to 57 atomic %.

In the X'—Pt—Mn alloy, the X' content is preferably in the range from 37 to 63 atomic %, and more preferably,47 to 57 atomic %. Furthermore, in the X'—Pt—Mn alloy, the X' content is preferably in the range from 0.2 to 10 atomic %.

However, when X' is at least one element selected from the group consisting of Pd, Ru, Ir, Rh and Os, the X' content is preferably in the range from 0.2 to 40 atomic %.

By using an alloy having the composition in the range described above as the antiferromagnetic layer 1 and by subjecting this to annealing treatment, an antiferromagnetic layer 1 which produces a large exchange coupling magnetic field can be obtained. In particular, if the Pt—Mn alloy is used, it is possible to obtain a superior antiferromagnetic layer 1 having an exchange coupling magnetic field of more than 800 Oe and a blocking temperature, at which the exchange coupling magnetic field disappears, as high as 380° C.

The pinned magnetic layer 2 is a ferromagnetic thin film, and for example, is composed of Co, an Ni—Fe alloy, a Co—Ni—Fe—alloy, a Co—Fe alloy, or a Co—Ni alloy, and preferably has a thickness of approximately 4 nm.

The pinned magnetic layer 2 is formed in contact with the antiferromagnetic layer 1, an exchange coupling magnetic field (exchange anisotropic magnetic field) is produced at the interface between the pinned magnetic layer 2 and the antiferromagnetic layer 1 by carrying out a magnetic annealing treatment (heat treatment), and for example, the magnetization direction of the pinned magnetic layer 2 is pinned in a direction opposite to the Y direction as shown in FIG. 3.

The nonmagnetic conductive layer 3 is composed of Cu or the like, and the thickness thereof is set in the range from 2.0 to 2.5 nm.

The free magnetic layer 4 is composed of a ferromagnetic material, such as Co, an Ni—Fe alloy, a Co—Ni—Fe alloy, a Co—Fe alloy, or a Co—Ni alloy. The free magnetic layer 4 usually has a thickness of approximately 2 to 5 nm. The magnetization direction of the free magnetic layer 4 is fixed in the X1 direction in the drawing by the magnetic flux of the bias layers 5.

The magnetization direction of the free magnetic layer 4 is perpendicular to the magnetization direction of the pinned magnetic layer 2.

The protective layer 7 composed of Ta or the like is formed on the free magnetic layer 4.

As shown in FIG. 3, the individual layers from a part of the underlying layer 6 to the protective layer 7 constitute the laminate 9 having a trapezoidal cross-section.

The bias layers 5 are formed on the antiferromagnetic layer 1 in the vicinity of the bottom of the trapezoidal laminate 9 with the bias underlying layers 10 composed of Fe or an Fe—Co alloy, therebetween.

The bias layers 5 are preferably composed of a Co—Pt alloy and usually have a thickness of 20 to 50 nm. Instead of the Co—Pt alloy, the bias layers 5 may be composed of a Co—Cr alloy, a Co—Cr—Ta alloy, or the like.

Since the bias layers 5 are magnetized in the X1 direction in the drawing, the magnetization of the free magnetic layer 4 is aligned in the X1 direction. Thereby, the variable magnetization of the free magnetic layer 4 and the pinned magnetization of the pinned magnetic layer 2 are perpendicular to each other.

The electrode layers 8 are formed on the bias layers 5. Nonmagnetic intermediate layers not shown in the drawing may be interposed between the bias layers 5 and the electrode layers 8. The intermediate layers act as buffer layers and as alignment layers, are preferably composed of Cr, Ta, or the like, and have a thickness of approximately 2 to 5 nm, and preferably, approximately 3.5 nm.

When exposed to high temperatures in the insulating resist-hardening step (UV cure or hard bake) carried out in the subsequent fabrication process of an inductive head (write head), the nonmagnetic intermediate layers act as diffusion barriers, and it is possible to prevent the magnetic properties of the bias layers 5 from degrading when thermal diffusion occurs between the bias layers 5 and the peripheral layers.

Preferably, the electrode layers 8 are single-layered or multi-layered and are composed of at least one element selected from the group consisting of Cr, Au, Ta, and W. Thereby, the resistance can be decreased.

When intermediate layers composed of Ta are interposed between the bias layers 5 and the electrode layers 8, by epitaxially growing electrode layers composed of Cr on the intermediate layers composed of Ta, the electrical resistance can be further decreased.

In the spin-valve thin-film magnetic element having the structure shown in FIG. 3, a sensing current is applied from the electrode layers 8 to the laminate 9. If a magnetic field is applied from a magnetic recording medium in the Y direction in FIG. 3, the magnetization of the free magnetic layer 4 is rotated from the X1 direction to the Y direction. At this stage, spin-dependent scattering of conduction electrons occurs due to a so-called GMR effect at the interface between the nonmagnetic conductive layer 3 and the free magnetic layer 4, and therefore, the electrical resistance is changed, and a fringing magnetic field from the recording medium is detected.

As described above, in the spin-valve thin-film magnetic element in this embodiment of the present invention, since the ferromagnetic bias layers 5 composed of the Co—Pt alloy are formed on the ferromagnetic bias underlying layers 10 composed of Fe or the Fe—Co alloy with a thickness of 1.6 to 4.3 nm, a very high coercive force (Hc) of the bias layers 5 can be maintained, and the bias magnetic field can be effectively applied to the free magnetic layer 4. Consequently, the free magnetic layer 4 can be satisfactorily aligned in a single-domain state, and a spin-valve thin-film magnetic element having superior stability in which Barkhausen noise is reduced can be obtained.

Second Embodiment

Figure 4:
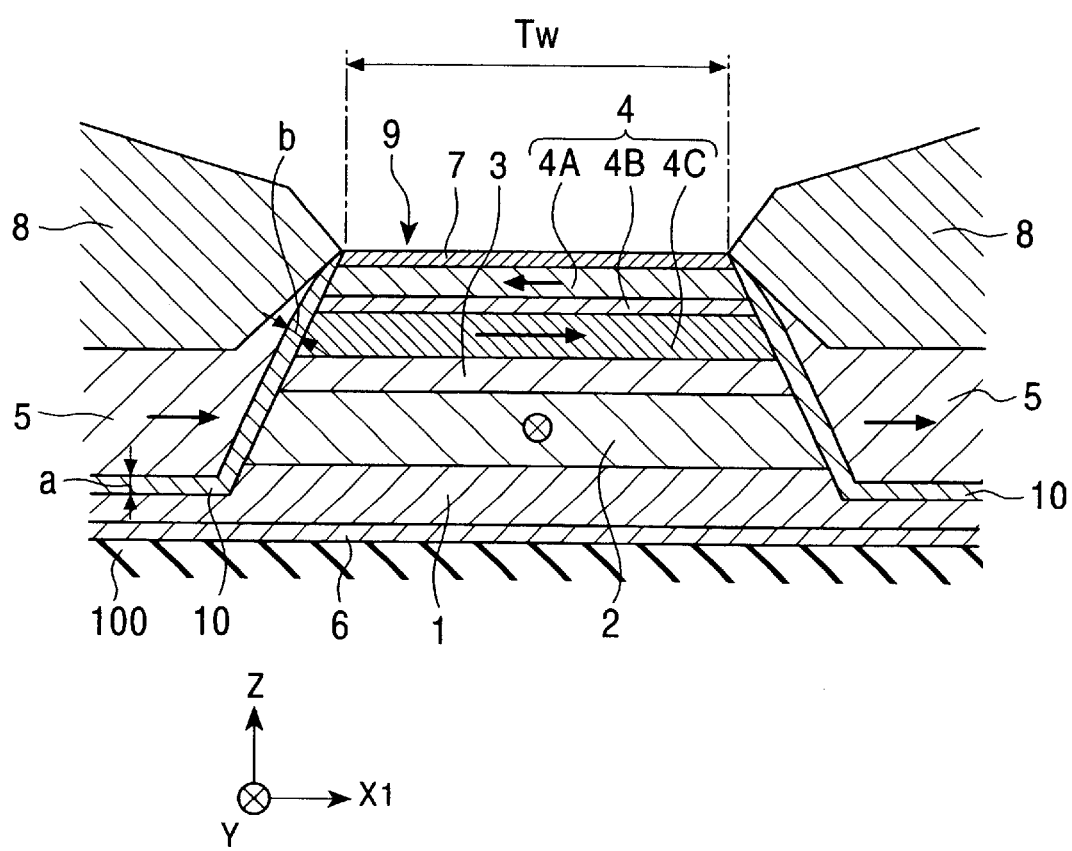
FIG. 4 is a sectional view of a spin-valve thin-film magnetic element in a second embodiment of the present invention, viewed from a surface facing a recording medium.

FIG. 4 is a sectional view of a spin-valve thin-film magnetic element in a second embodiment of the present invention, viewed from a surface facing a recording medium.

The spin-valve thin-film magnetic element in the second embodiment of the present invention is a so-called "bottom type" in which an underlying layer 6, an antiferromagnetic layer 1, a pinned magnetic layer 2, a nonmagnetic conductive layer 3, a free magnetic layer 4, and a protective layer 7 are formed in that order on a substrate 100, and moreover, the free magnetic layer 4 includes a first free magnetic layer 4A, a nonmagnetic intermediate layer 4B, and a second free magnetic layer 4C formed on the first free magnetic layer 4A with the nonmagnetic intermediate layer 4B therebetween, the magnetization direction of the second free magnetic layer 4C being antiparallel to the magnetization direction of the first free magnetic layer 4A, and the free magnetic layer is in a synthetic ferrimagnetic state. Thus, the spin-valve thin-film magnetic element in the second embodiment is one type of so-called synthetic-ferri-free type single spin-valve thin-film element.

The antiferromagnetic layer 1 is provided on the substrate 100, and the pinned magnetic layer 2 is formed on the antiferromagnetic layer 1.

The nonmagnetic conductive layer 3 composed of Cu or the like is formed on the pinned magnetic layer 2, and the free magnetic layer 4 is formed on the nonmagnetic conductive layer 3.

The free magnetic layer 4 includes the first free magnetic layer 4A and the second free magnetic layer 4C separated by the nonmagnetic intermediate layer 4B. The magnetization directions of the free magnetic layers 4A and 4C are antiparallel to each other, thus being in a ferrimagnetic state.

The protective layer 7 composed of Ta or the like is formed on the first free magnetic layer 4A.

The individual layers from a part of the underlying layer 6 to the protective layer 7 constitute a laminate 9 having a trapezoidal cross-section.

Reference numeral 5 represents a bias layer and reference numeral 8 represents an electrode layer. The principal part of the bias layer 5 is formed on the antiferromagnetic layer 1 extending beyond the periphery of the laminate 9 with a bias underlying layer 10 therebetween, and also parts of the bias layers 5 are formed on both sides in the track-width direction of the trapezoidal laminate 9.

By fabricating the bottom-type spin-valve thin-film magnetic element which is similar to that in the first embodiment in which the individual layers are deposited in the order as described above, it is possible to improve the proportion of the sensing current applied to the laminate 9 without passing through the antiferromagnetic layer 1 having a high resistivity, and therefore, side reading can be avoided.

The difference between the spin-valve thin-film magnetic element in the second embodiment and the spin-valve thin-film magnetic element in the first embodiment lies on the structure of the free magnetic layer 4. The layers other than the free magnetic layer 4 may be constructed in the same manner as that in the first embodiment. Therefore, description will now be focused on the free magnetic layer 4.

In the free magnetic layer 4 of the spin-valve thin-film magnetic element in the second embodiment of the present invention, the first free magnetic layer 4A and the second free magnetic layer 4C are separated by the nonmagnetic intermediate layer 4B, and the magnetization directions of the first free magnetic layer 4A and the second free magnetic layer 4C are antiparallel to each other, thus being in a ferrimagnetic state. The first free magnetic layer 4A is provided on the protective layer 7 side, and the second free magnetic layer 4C is provided on the nonmagnetic conductive layer 3 side.

The first free magnetic layer 4A and the second free magnetic layer 4C are preferably composed of Co, an Ni—Fe alloy, a Co—Ni—Fe alloy, a Co—Fe alloy, a Co—Ni alloy, or the like. The nonmagnetic intermediate layer 4B is preferably composed of at least one metal selected from the group consisting of Ru, Rh, Ir, Cr, Re, and Cu.

The first free magnetic layer 4A and the second free magnetic layer 4C have different thicknesses.

In the free magnetic layer 4, the magnetization direction of the second free magnetic layer 4C is fixed in the X1 direction in the drawing by the magnetic flux of the bias layers 5, and the magnetization direction of the first free magnetic layer 4A is fixed in a direction opposite to the X1 direction. The first free magnetic layer 4A is magnetically coupled to the second free magnetic layer 4C by an exchange coupling magnetic field (RKKY interaction), and is magnetized in the direction opposite to the X1 direction. The magnetizations of the first free magnetic layer 4A and the second free magnetic layer 4C are reversible under the influence of an external magnetic field while maintaining a ferrimagnetic state. That is, when the magnetization direction of the second free magnetic layer 4C is aligned in the X1 direction, the magnetization direction of the first free magnetic layer 4A is aligned in a direction opposite to the X1 direction.

Both the first free magnetic layer 4A and the second free magnetic layer 4C preferably have a thickness of approximately 2 to 5 nm, and the thickness $t_2$ of the second free magnetic layer 4C is set larger than the thickness $t_1$ of the first free magnetic layer 4A.

When the saturation magnetization of the first free magnetic layer 4A and the saturation magnetization of the second free magnetic layer 4C are set at $M_1$ and $M_2$, respectively, the magnetic thickness of the first free magnetic layer 4A and the magnetic thickness of the second free magnetic layer 4C are $M_1 \cdot t_1$ and $M_2 \cdot t_2$, respectively.

The magnetic thicknesses of the first free magnetic layer 4A and the second free magnetic layer 4C are set so as to satisfy the relationship $M_2 \cdot t_2 > M_1 \cdot t_1$. Since the relationship $M_2 \cdot t_2 > M_1 \cdot t_1$ is satisfied, the magnetization of the second free magnetic layer 4C remains, and the magnetization direction of the entire free magnetic layer 4 is aligned in the X1 direction. At this stage, the effective magnetic thickness of the free magnetic layer 4 is expressed as $(M_2 \cdot t_2 - M_1 \cdot t_1)$.

Since the first free magnetic layer 4A and the second free magnetic layer 4C are antiferromagnetically coupled to each other so that the magnetization directions thereof are antiparallel to each other, and the magnetic thicknesses thereof satisfy the relationship $M_2 \cdot t_2 > M_1 \cdot t_1$, a synthetic ferrimagnetic state is brought about.

Consequently, the magnetization direction of the free magnetic layer 4 and the magnetization direction of the pinned magnetic layer 2 are perpendicular to each other.

In the spin-valve thin-film magnetic element in this embodiment, by setting the magnetic thickness of the first free magnetic layer 4A smaller than that of the second free magnetic layer 4C, a difference between the magnetic thicknesses of the first free magnetic layer 4A and the second free magnetic layer 4C corresponds to the effective magnetic thickness of the free magnetic layer 4. Consequently, by appropriately adjusting the thicknesses of the first free magnetic layer 4A and the second free magnetic layer 4C so as to make the effective thickness of the free magnetic layer 4 small, the magnetization direction of the free magnetic layer 4 can be varied by a small external magnetic field, and thus the sensitivity of the spin-valve thin-film magnetic element can be improved. Additionally, since the thickness of the entire free magnetic layer 4 can be increased to a certain degree, the rate of resistance change is not extremely decreased, and the sensitivity of the spin-valve thin-film magnetic element can be improved.

As described above, the spin-valve thin-film magnetic element in the second embodiment is the same as that in the first embodiment apart from the fact that the free magnetic layer 4 is divided into the first free magnetic layer 4A and the second free magnetic layer 4C. Since the bias underlying layers 10, the bias layers 5, and the electrode layers 8 are the same as those in the first embodiment, a detailed description thereof will be omitted.

In the second embodiment, by setting the ratio b/a at 1 or more, it is also possible to increase the coercive force of the bias layers 5 composed of a Co—Pt alloy to 750 Oe or more, and thus a bias magnetic field can be effectively applied to the free magnetic layer 4. Consequently, the free magnetic layer can be satisfactorily aligned in a single-domain state, and it is possible to obtain a spin-valve thin-film magnetic element having superior stability in which Barkhausen noise is reduced.

Next, with reference to FIGS. 5 to 8, a method for fabricating the spin-valve thin-film magnetic element in the second embodiment shown in FIG. 4 will be described in detail.

Figure 5:
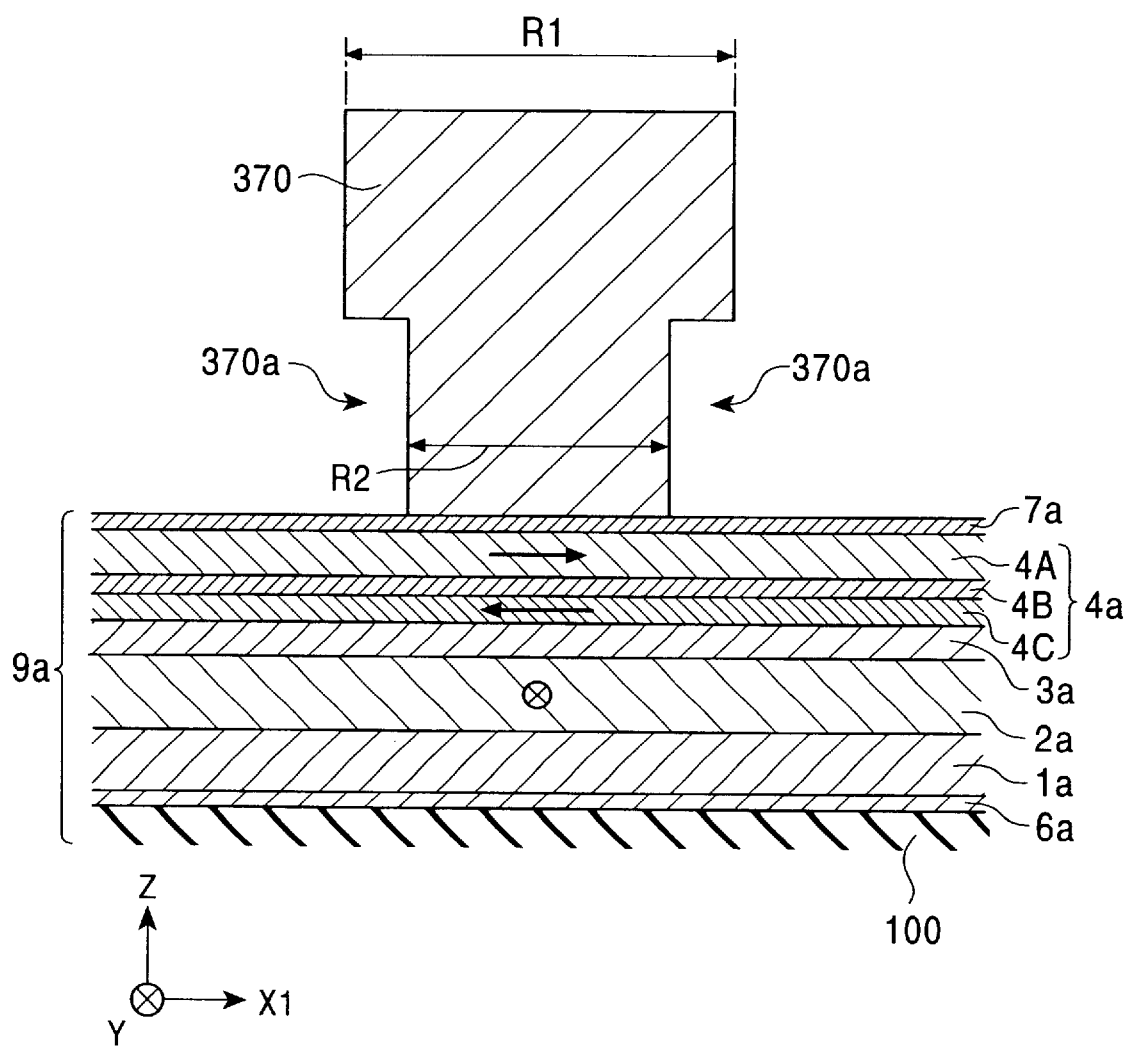
FIG. 5 is a sectional view illustrating a step of fabricating a spin-valve thin-film magnetic element of the present invention.

First, as shown in FIG. 5, on the substrate 100, a Ta film 6a for forming the underlying layer 6, a Pt—Mn alloy film 1a for forming the antiferromagnetic layer 1, a Co—Fe alloy film 2a for forming the pinned magnetic layer 2, a Cu film 3a for forming the nonmagnetic conductive layer 3, a multilayered film 4a composed of a Co—Fe alloy/Ru/a Co—Fe alloy for forming the first free magnetic layer 4A, the nonmagnetic intermediate layer 4B, and the second free magnetic layer 4C, and a Ta film 7a for forming the protective layer 7 are deposited in that order to produce a laminate 9a. A lift-off resist layer 370 is then formed on the laminate 9a. The width R1 of the lift-off resist layer 370 is set to be equal to the width of the laminate 9 of the spin-valve thin-film magnetic element to be fabricated. The width R2 of a section of the lift-off resist layer 370 in contact with the upper surface of the laminate 9a is set slightly smaller than the width R1 so that lift-off can be performed easily.

Figure 6:
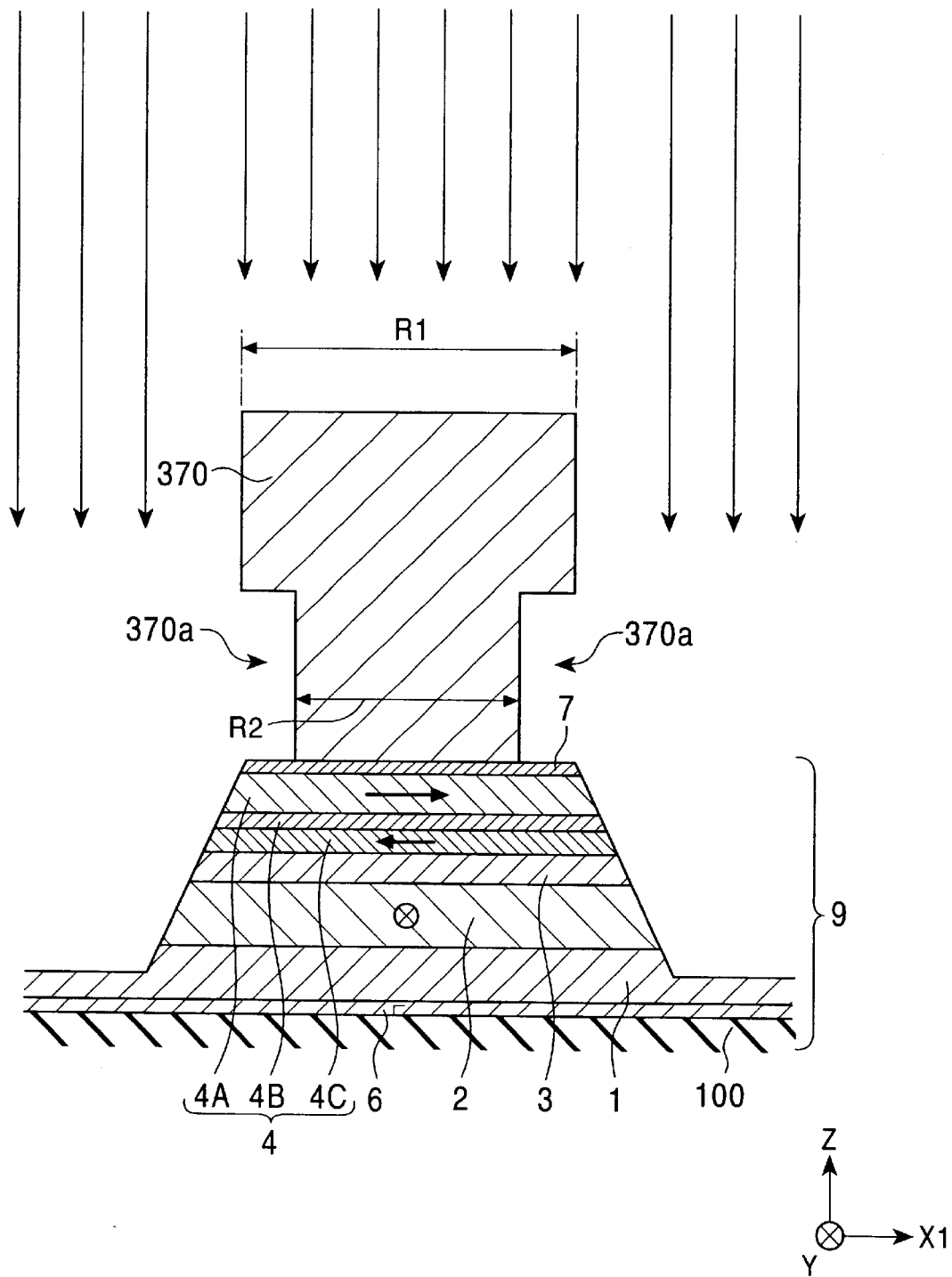
FIG. 6 is a sectional view illustrating a step of fabricating the spin-valve thin-film magnetic element subsequent to the step shown in FIG. 5.

Next, as shown in FIG. 6, regions not covered with the lift-off resist layer 370 are removed as far as the middle of the antiferromagnetic layer 1 by ion milling, and inclined planes corresponding to the sides of the spin-valve thin-film magnetic element shown in FIG. 4 are formed, and thus the trapezoidal laminate 9 is obtained. At this stage, preferably, the angle ($\alpha$) between the upper surface of the substrate 100 and the inclined plane on each side of the laminate 9 is set at 45 degrees.

Figure 7:
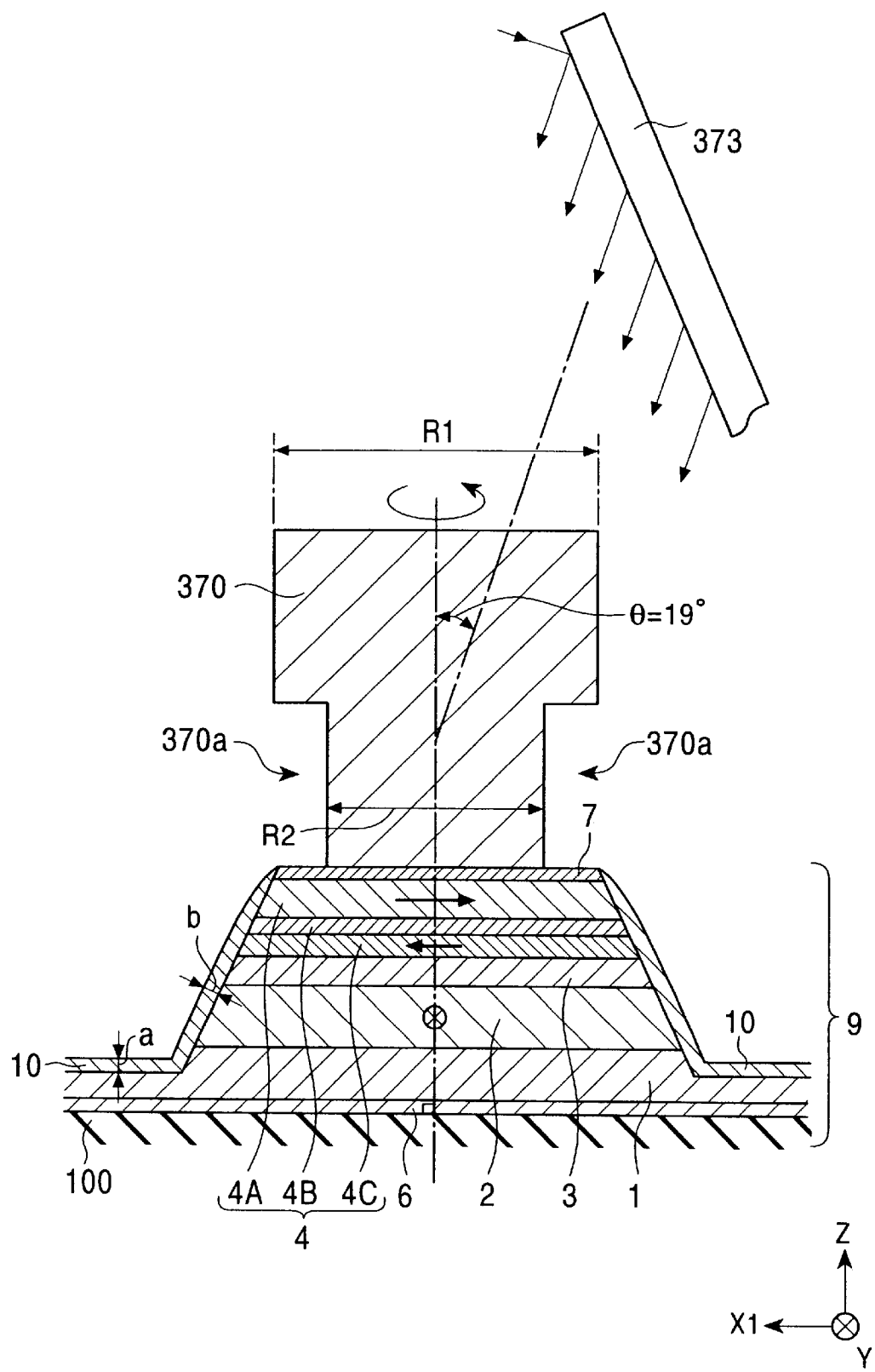
FIG. 7 is a sectional view illustrating a step of fabricating the spin-valve thin-film magnetic element subsequent to the step shown in FIG. 6.

Next, as shown in FIG. 7, the bias underlying layers 10 are formed on both sides of the laminate 9 and on the planer sections of the antiferromagnetic layer 1 extending from the bottom of the laminate 9, which are not covered with the lift-off resist layer 370.

At this stage, a sputtering target 373 comprising Fe or an Fe—Co alloy for forming the bias underlying layers are held opposed to the substrate 100 at an angle, and deposition is performed by any one of ion-beam sputtering, long-throw sputtering, and collimation sputtering, or a method in which these are combined.

By setting the angle ($\theta$) between the incident direction of sputtered particles and the direction of the normal to the substrate 100 at 19 degrees, it is possible to form bias underlying films on the inclined planes of the laminate 9 and on the planar sections of the antiferromagnetic layer 1 with substantially the same thickness, at approximately 2 nm.

As described above, by optimizing the angle ($\theta$) between the incident direction of sputtered particles and the direction of the normal to the substrate 100, and by sputtering using a sputtering method which enables superior directivity of sputtered particles, such as ion-beam sputtering, long-throw sputtering, or collimation sputtering, the thickness of the resulting sputtered film can be accurately controlled.

Figure 8:
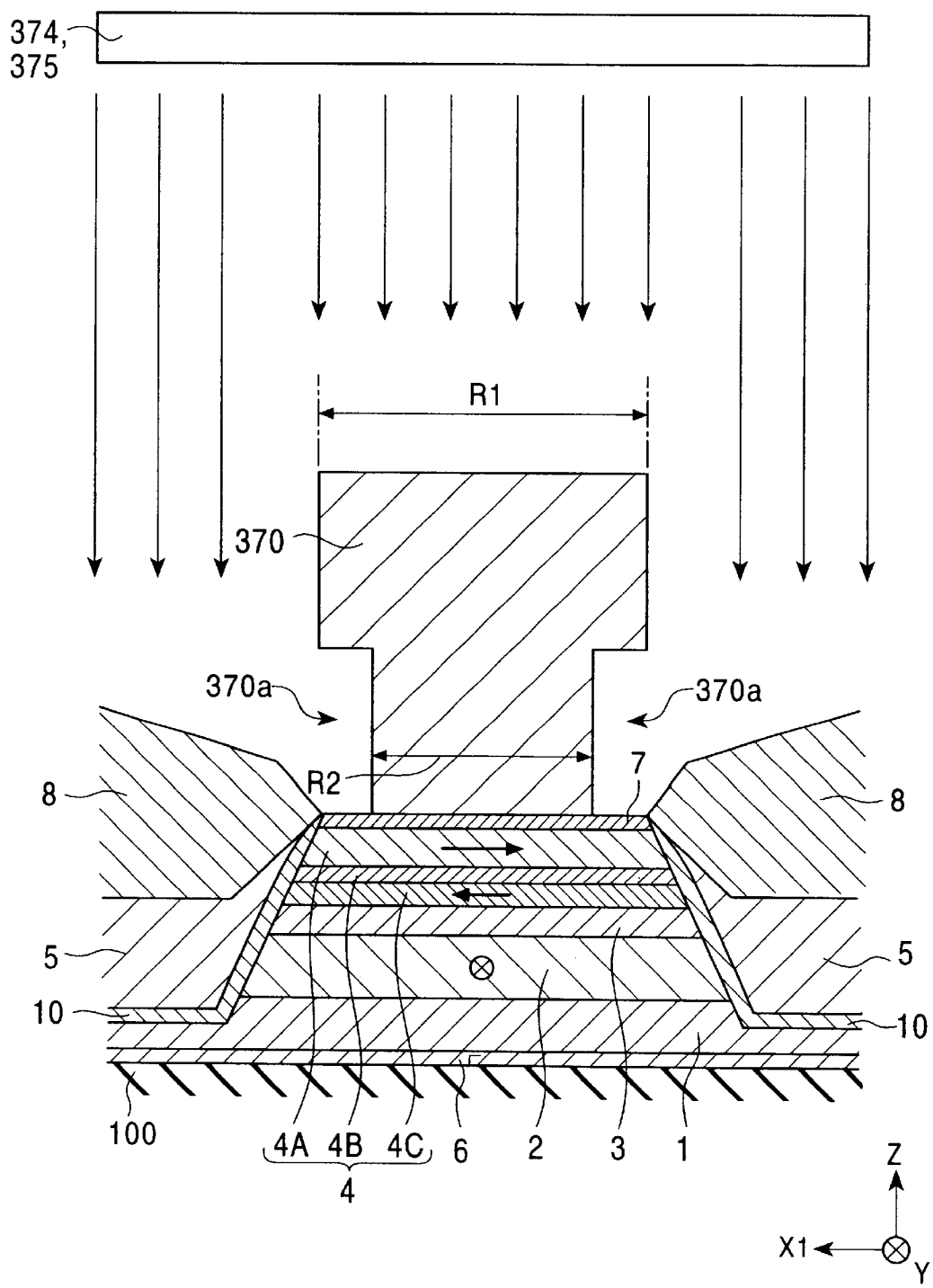
FIG. 8 is a sectional view illustrating a step of fabricating the spin-valve thin-film magnetic element subsequent to the step shown in FIG. 7.

Next, as shown in FIG. 8, the bias layers 5 are formed on the bias underlying layers 10. The bias layers 5 are deposited by sputtering while disposing a sputtering target 374 composed of, for example, a Co—Pt alloy, at an angle to the substrate plane, or parallel to the substrate plane. At this stage, since sputtered particles are blocked by the lift-off resist layer 370, the thickness of the film deposited becomes small in the vicinity of the lift-off resist layer 370. It is possible to adjust the thicknesses of the bias layers deposited in the individual sections by appropriately setting the angle between the sputtering target and the substrate plane.

After the bias layers 5 are formed, the electrode layers 8 are formed thereon. The electrode layers 8 may be formed in the same manner as the bias layers 5 while replacing the bias layer-forming sputtering target 374 with an electrode layer-forming sputtering target 375.

As described above, the synthetic-ferri-free type single spin-valve thin-film magnetic element shown in FIG. 4 is obtained, in which the bias underlying layers composed of Fe or the Fe—Co alloy with controlled thicknesses are provided.

Third Embodiment

Figure 9:
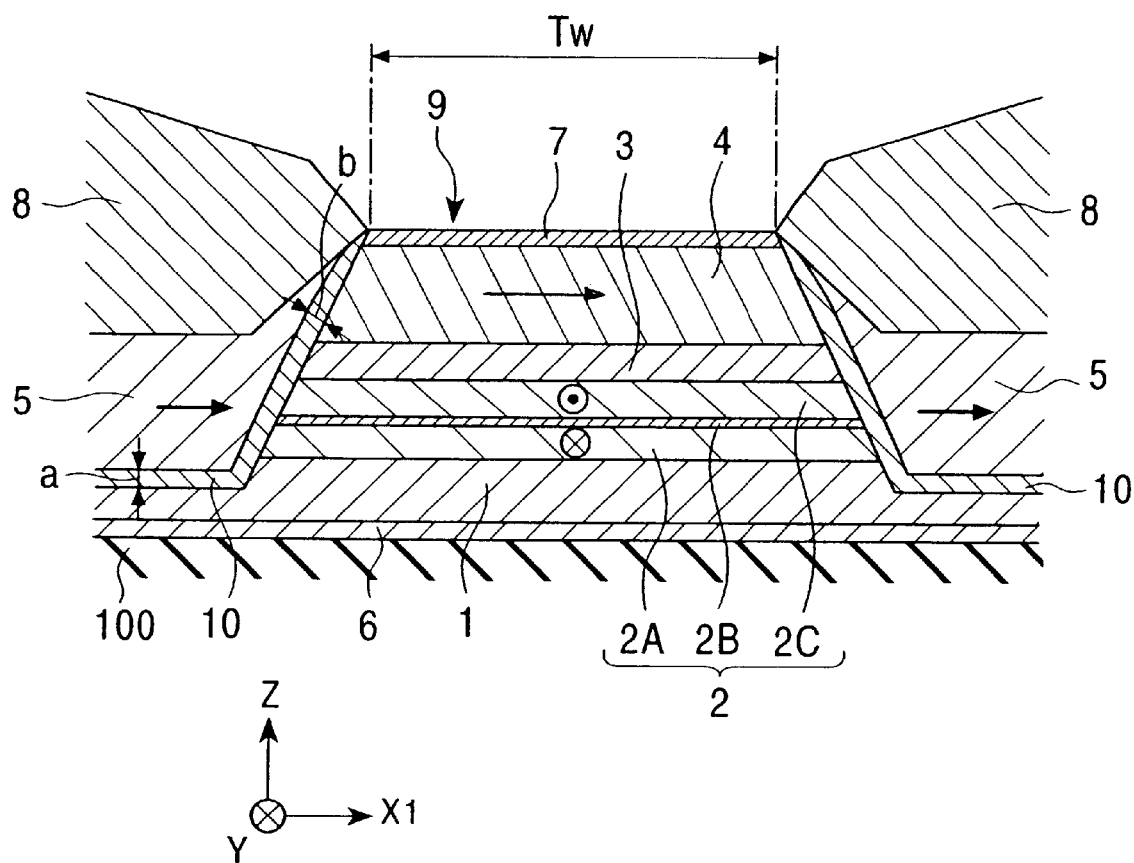
FIG. 9 is a sectional view of a spin-valve thin-film magnetic element in a third embodiment of the present invention, viewed from a surface facing a recording medium.

FIG. 9 is a sectional view of a spin-valve thin-film magnetic element in a third embodiment of the present invention.

The spin-valve thin-film magnetic element in the third embodiment is the same as the spin-valve thin-film magnetic element in the first embodiment apart from the fact that the pinned magnetic layer 2 has a so-called synthetic-ferri-pinned type structure including a first pinned magnetic layer 2A and a second pinned magnetic layer 2C interposed by a nonmagnetic intermediate layer 2B, the magnetization direction of the first pinned magnetic layer 2A being pinned by an exchange anisotropic magnetic field with the antiferromagnetic layer 1, and the magnetization direction of the second pinned magnetic layer 2C being aligned antiparallel to the magnetization direction of the first pinned magnetic layer 2A.

In such a structure, the demagnetizing field (dipole magnetic field) due to the pinned magnetization of the pinned magnetic layer 2 can be cancelled by the magnetostatic coupling magnetic field of the first pinned magnetic layer 2A and the magnetostatic coupling magnetic field of the second pinned magnetic layer 2C. Thereby, it is possible to decrease the influence of the demagnetizing field due to the pinned magnetization of the pinned magnetic layer 2 upon the variable magnetization of the free magnetic layer 4.

In the spin-valve thin-film magnetic element in which the pinned magnetic layer 2 is divided into two with the nonmagnetic intermediate layer 2B therebetween as described above, one of the divided pinned magnetic layers pins the other in an appropriate direction, and thus the pinned magnetic layer can be maintained in a very stable state.

The spin-valve thin-film magnetic element in the third embodiment is also provided with thin films composed of Fe or an Fe—Co alloy, with a thickness of 1.6 to 4.3 nm, as bias underlying layers 10 for bias layers 5 composed of a Co—Pt alloy. With respect to the thickness (b) of the bias underlying layers 10 formed on both inclined planes of the laminate and the thickness (a) of the bias underlying layers 10 extending over the peripheries of the laminate, the ratio b/a is preferably set in the range from 1.00 to 2.15, and more preferably, in the range from 1.00 to 1.75. Consequently, it is possible to maintain the coercive force of the Co—Pt alloy constituting the bias layers 5 at a high level, and a bias magnetic field can be effectively applied to the free magnetic layer 4, and it is possible to obtain a spin-valve thin-film magnetic element having superior stability in which the free magnetic layer is satisfactorily aligned in a single-domain state and Barkhausen noise is reduced.

In order to fabricate the synthetic-ferri-pinned type spin-valve thin-film magnetic element in the third embodiment, in the step of forming the laminate 9, the pinned magnetic layer 2 is constructed so as to have a three-layered structure including the first pinned magnetic layer 2A, the nonmagnetic intermediate layer 2B on the first pinned magnetic layer 2A, and the second pinned magnetic layer 2C on the nonmagnetic intermediate layer 2B. Since the fabrication steps other than this are the same as those described with respect to the fabrication method in the second embodiment, a detailed description thereof will be omitted.

In the spin-valve thin-film magnetic element in the third embodiment, it is also possible to increase the coercive force of the Co—Pt alloy constituting the bias layers 5 to 750 Oe or more by setting the ratio b/a at 1 or more, and thus a bias magnetic field can be effectively applied to the free magnetic layer 4. Consequently, the free magnetic layer can be satisfactorily aligned in a single-domain state, and it is possible to obtain a spin-valve thin-film magnetic element having superior stability in which Barkhausen noise is reduced.

Fourth Embodiment

Figure 10:
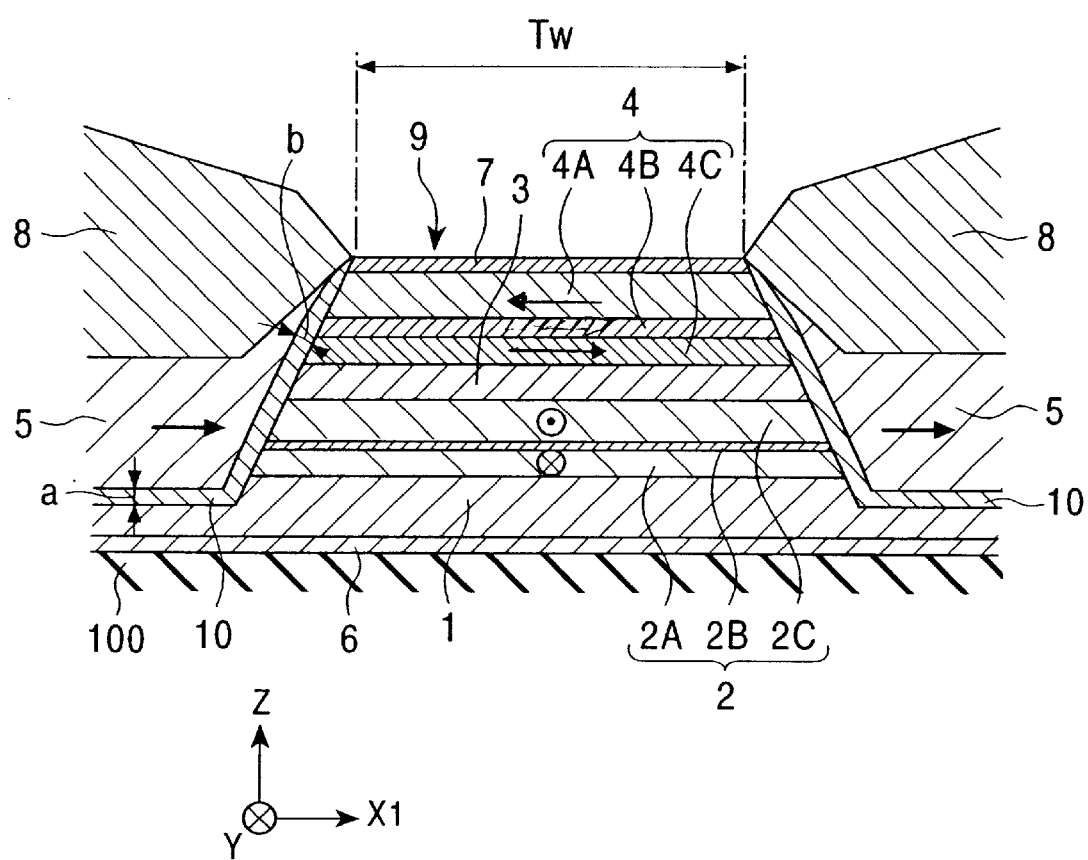
FIG. 10 is a sectional view of a spin-valve thin-film magnetic element in a fourth embodiment of the present invention, viewed from a surface facing a recording medium.

FIG. 10 is a sectional view of a spin-valve thin-film magnetic element in a fourth embodiment of the present invention, viewed from a surface facing a recording medium.

The spin-valve thin-film magnetic element in the fourth embodiment differs from the spin-valve thin-film magnetic elements in the previous embodiments in that a so-called synthetic-ferri-pinned type structure is used in which a pinned magnetic layer 2 is divided into two with a nonmagnetic intermediate layer therebetween and that a so-called synthetic-ferri-free type structure is employed in which a free magnetic layer 4 includes a first free magnetic layer 4A, a second free magnetic layer 4C, and a nonmagnetic intermediate layer 4B interposed between the first free magnetic layer 4A and the second free magnetic layer 4C, the magnetization direction of the second free magnetic layer 4C being aligned antiparallel to the magnetization direction of the first free magnetic layer 4A, and thus the free magnetic layer 4 is in a synthetic ferrimagnetic state.

As shown in FIG. 10, an antiferromagnetic layer 1 is provided on a substrate 100 with an underlying layer 6 therebetween. The pinned magnetic layer 2 is formed on the antiferromagnetic layer 1.

The pinned magnetic layer 2 includes the first pinned magnetic layer 2A, and the second pinned magnetic layer 2B formed on the first pinned magnetic layer 2A with the nonmagnetic intermediate layer 2B therebetween, the magnetization direction of the second pinned magnetic layer 2C being aligned antiparallel to the magnetization direction of the first pinned magnetic layer 2A.

A nonmagnetic conductive layer 3 composed of Cu or the like is formed on the pinned magnetic layer 2, and the free magnetic layer 4 is formed on the nonmagnetic conductive layer 3.

The free magnetic layer 4 includes the first free magnetic layer 4A and the second free magnetic layer 4C separated by the nonmagnetic intermediate layer 4B, and the magnetization directions of the first and second free magnetic layers 4A and 4C are antiparallel to each other, thus being in a ferrimagnetic state.

On the first free magnetic layer 4A, a protective layer 7 composed of Ta or the like is formed.

As shown in FIG. 10, the individual layers from a part of the antiferromagnetic layer 1 to the protective layer 7 constitute a laminate 9 having a trapezoidal cross-section.

Reference numeral 10 represents a bias underlying layer, reference numeral 5 represents a bias layer, and reference numeral 8 represents an electrode layer.

The principal part of the bias layer 5 is formed on the antiferromagnetic layer 1 extending beyond the periphery of the laminate 9 with the bias underlying layer 10 therebetween, and also is provided on each side in the track-width direction of the trapezoidal laminate 9. The electrode layers 8 are formed on the bias layers 5.

By fabricating the bottom type spin-valve thin-film magnetic element in which the individual layers are deposited in the order described above, it is possible to improve the proportion of the sensing current applied to the laminate 9 without passing through the antiferromagnetic layer 1 having a high resistivity, and therefore, side reading can be avoided, and it is possible to further cope with the higher magnetic recording densities.

In the spin-valve thin-film magnetic element in the fourth embodiment, preferably, the antiferromagnetic layer 1 is formed with a thickness of approximately 8 to 11 nm in the center of the laminate 9 and is composed of a Pt—Mn alloy. The Pt—Mn alloy containing 37 to 63 atomic % of Pt has superior corrosion resistance, a high blocking temperature, and a large exchange coupling magnetic field (exchange anisotropic magnetic field). Instead of the Pt—Mn alloy, an Ni—Mn alloy or an Fe—Mn alloy may be used.

By using the alloy in the compositional range described above as the antiferromagnetic layer 1 and by subjecting this to annealing treatment, it is possible to obtain an antiferromagnetic layer 1 producing a large exchange coupling magnetic field. In particular, if the Pt—Mn alloy is used, it is possible to obtain a superior antiferromagnetic layer 1 having an exchange coupling magnetic field of more than 800 Oe and a blocking temperature, at which the exchange coupling magnetic field disappears, as high as 380° C.

The first and second pinned magnetic layers 2A and 2C are composed of ferromagnetic thin films and for example, are composed of Co, an Ni—Fe alloy, a Co—Ni—Fe alloy, a Co—Fe alloy, or a Co—Ni alloy. Preferably, the first pinned magnetic layer 2A is, for example, composed of Co and has a thickness of 1.3 to 1.5 nm, the second pinned magnetic layer 2C is, for example, composed of Co and has a thickness of 2 to 2.5 nm, and the entire pinned magnetic layer has a thickness of approximately 4.0 nm.

Preferably, the nonmagnetic intermediate layer 2B is composed of at least one metal selected from the group consisting of Ru, Rh, Ir, Cr, Re, and Cu, and has a thickness of approximately 0.8 nm.

The first pinned magnetic layer 2A is formed in contact with the antiferromagnetic layer 1, and by magnetic annealing (heat treatment), an exchange coupling magnetic field (exchange anisotropic magnetic field) is produced at the interface between the first pinned magnetic layer 2A and the antiferromagnetic layer 1. For example, the magnetization direction of the first pinned magnetic layer 2A is pinned in the Y direction as shown in FIG. 10. If the magnetization direction of the first pinned magnetic layer 2A is pinned in the Y direction, the magnetization direction of the second pinned magnetic layer 2C which is opposed to the first pinned magnetic layer 2A with the nonmagnetic intermediate layer 2B therebetween is pinned antiparallel to the magnetization direction of the first pinned magnetic layer 2A, namely, in a direction opposite to the Y direction.

As the exchange coupling magnetic field is increased, it is possible to more stably maintain the magnetization direction of the first pinned magnetic layer 2A and the magnetization direction of the second pinned magnetic layer 2C in an antiparallel state. In particular, by using the Pt—Mn alloy, which has a high blocking temperature and produces a large exchange coupling magnetic field (exchange anisotropic magnetic field) at the interface with the first pinned magnetic layer 2A, as the antiferromagnetic layer 1, it is possible to maintain the thermal stability of the magnetization state of the first pinned magnetic layer 2A and the second pinned magnetic layer 2C.

In this embodiment, by setting the thickness ratio between the first pinned magnetic layer 2A and the second pinned magnetic layer 2C in an appropriate range, the exchange coupling magnetic field (Hex) can be increased, and the magnetization directions of the first pinned magnetic layer 2A and the second pinned magnetic layer 2C can be kept in an antiparallel state (in a ferrimagnetic state) which is thermally stable, and also substantially the same rate of resistance change (ΔR/R) as that in the conventional spin-valve thin-film magnetic element can be secured. Moreover, by appropriately controlling the size and the direction of the magnetic field during heat treatment, the magnetization directions of the first pinned magnetic layer 2A and the second pinned magnetic layer 2C can be set in desired directions.

The free magnetic layer 4 is divided into the first and second free magnetic layers 4A and 4C by the nonmagnetic intermediate layer 4B, and the magnetization directions of the first and second free magnetic layers 4A and 4A are antiparallel to each other, namely, in a ferrimagnetic state. The first free magnetic layer 4A is provided on the protective layer 7 side, and the second free magnetic layer 4C is provided on the nonmagnetic conductive layer 3 side.

The first and second free magnetic layers 4A and 4C are composed of, for example, Co, an Ni—Fe alloy, a Co—Ni—Fe alloy, a Co—Fe alloy, or a Co—Ni alloy. The nonmagnetic intermediate layer 4B is preferably composed of at least one metal selected from the group consisting of Ru, Rh, Ir, Cr, Re, and Cu.

Both the first free magnetic layer 4A and the second free magnetic layer 4C preferably have a thickness of approximately 2 to 5 nm, and the thickness $t_1$ of the first free magnetic layer 4A is set smaller than the thickness $t_2$ of the second free magnetic layer 4C.

When the saturation magnetization of the first free magnetic layer 4A and the saturation magnetization of the second free magnetic layer 4C are set at $M_1$ and $M_2$, respectively, the magnetic thickness of the first free magnetic layer 4A and the magnetic thickness of the second free magnetic layer 4C are $M_1 \cdot t_1$ and $M_2 \cdot t_2$, respectively.

The magnetic thicknesses of the first free magnetic layer 4A and the second free magnetic layer 4C are set so as to satisfy the relationship $M_2 \cdot t_2 > M_1 \cdot t_1$. Since the relationship $M_2 \cdot t_2 > M_1 \cdot t_1$ is satisfied, the magnetization of the second free magnetic layer 4C remains, and the magnetization direction of the entire free magnetic layer 4 is aligned in the X1 direction. At this stage, the effective magnetic thickness of the free magnetic layer 4 is expressed as $(M_2 \cdot t_2 - M_1 \cdot t_1)$.

In the free magnetic layer 4, the magnetization direction of the second free magnetic layer 4C is fixed in the X1 direction in the drawing by the magnetic flux of the bias layers 5, and the first free magnetic layer 4A is magnetically coupled to the second free magnetic layer 4C by an exchange coupling magnetic field (RKKY interaction) and is magnetized in the direction opposite to the X1 direction. That is, when the magnetization direction of the second free magnetic layer 4C is aligned in the X1 direction by the bias layers 5, the magnetization direction of the first free magnetic layer 4A is aligned in the direction opposite to the X1 direction. The magnetizations of the first free magnetic layer 4A and the second free magnetic layer 4C are reversible under the influence of an external magnetic field while maintaining a ferrimagnetic state.

Since the first free magnetic layer 4A and the second free magnetic layer 4C are antiferromagnetically coupled to each other so that the magnetization directions thereof are antiparallel to each other, and the magnetic thicknesses thereof satisfy the relationship $M_2 \cdot t_2 > M_1 \cdot t_1$, a synthetic ferrimagnetic state is brought about.

Consequently, the magnetization direction of the free magnetic layer 4 and the magnetization direction of the pinned magnetic layer 2 are perpendicular to each other.

In the spin-valve thin-film magnetic element in this embodiment, by setting the magnetic thickness of the first free magnetic layer 4A smaller than that of the second free magnetic layer 4C, a difference between the magnetic thicknesses of the first free magnetic layer 4A and the second free magnetic layer 4C corresponds to the effective magnetic thickness of the free magnetic layer 4. Consequently, by appropriately adjusting the thicknesses of the first free magnetic layer 4A and the second free magnetic layer 4C so as to make the effective thickness of the free magnetic layer 4 small, the magnetization direction of the free magnetic layer 4 can be varied by a small external magnetic field, and thus the sensitivity of the spin-valve thin-film magnetic element can be improved.

Additionally, since the thickness of the entire free magnetic layer 4 can be increased to a certain degree, the rate of resistance change is not extremely decreased, and the sensitivity of the spin-valve thin-film magnetic element can be improved.

The protective layer 7 composed of Ta or the like is formed on the free magnetic layer 4.

The protective layer 7 acts as a buffer layer and as an alignment layer, and may be composed of Cr instead of Ta. The protective layer 7 has a thickness of, for example, approximately 2 to 5 nm, and preferably, approximately 3.5 nm.

When exposed to high temperatures in the insulating resist-hardening step (UV cure or hard bake) carried out in the subsequent fabrication process of an inductive head (write head), the protective layer 7 acts as a diffusion barrier, and it is possible to prevent the magnetic properties of the free magnetic layer 4 from degrading due to the occurrence of thermal diffusion between the gap film and the free magnetic layer.

The spin-valve thin-film magnetic element in the fourth embodiment is also provided with thin films composed of Fe or an Fe—Co alloy, with a thickness of 1.6 to 4.3 nm, as bias underlying layers 10 for bias layers 5 composed of a Co—Pt alloy. In the spin-valve thin-film magnetic element in the fourth embodiment, it is also possible to increase the coercive force of the Co—Pt alloy constituting the bias layers 5 to 750 Oe or more by setting the ratio b/a at 1 or more, and thus a bias magnetic field can be effectively applied to the free magnetic layer 4.

Consequently, the free magnetic layer can be satisfactorily aligned in a single-domain state, and it is possible to obtain a spin-valve thin-film magnetic element having superior stability in which Barkhausen noise is reduced.

Preferably, the bias layers 5 have a thickness of 20 to 50 nm, and is composed of a Co—Pt alloy. When the bias layers 5 are composed of the Co—Pt alloy, the Co—Pt alloy can exhibit a high coercive force under the influence of the bias underlying layers 10 composed of Fe or the Fe—Co alloy with a thickness of 1.6 to 4.3 nm.

The bias layers 5 may be composed of a Co—Cr—Pt alloy, a Co—Cr—Ta alloy, or the like, instead of the Co—Pt alloy.

Since the bias layers 5 are magnetized in the X1 direction in the drawing, the magnetization of the second free magnetic layer 4C is aligned in the X1 direction. Thereby, the variable magnetization of the free magnetic layer 4 and the pinned magnetization of the pinned magnetic layer 2 are perpendicular to each other.

Preferably, the electrode layers 8 are single-layered or multi-layered and are composed of at least one element selected from the group consisting of Cr, Au, Ta, and W. Thereby, the resistance can be decreased. By selecting Cr as the electrode layers 8 and by interposing intermediate layers (not shown in the drawing) composed of Ta between the bias layers 5 and the electrode layers 8, the electrical resistance can be further decreased.

In the spin-valve thin-film magnetic element having the structure shown in FIG. 10, a sensing current is applied from the electrode layers 8 to the laminate 9. If a magnetic field is applied from a magnetic recording medium in the Y direction in FIG. 10, the magnetization of the free magnetic layer 4 is rotated from the X1 direction to the Y direction. At this stage, spin-dependent scattering of conduction electrons occurs due to a so-called GMR effect at the interface between the nonmagnetic conductive layer 3 and the free magnetic layer 4, and therefore, the electrical resistance is changed, and a fringing magnetic field from the recording medium is detected.

As described above, in the spin-valve thin-film magnetic element in this embodiment, the bias layers 5 easily apply a strong bias magnetic field to the free magnetic layer 4, the free magnetic layer 4 is easily aligned in a single-domain state, Barkhausen noise can be reduced, and it is possible to obtain a spin-valve thin-film magnetic element having superior stability.

In order to fabricate the spin-valve thin-film magnetic element in the fourth embodiment, the laminate 9 is formed so that the pinned magnetic layer 2 has a three-layered structure including the first pinned magnetic layer 2A, the nonmagnetic intermediate layer 2B disposed on the first pinned magnetic layer 2A, and the second pinned magnetic layer 2C disposed on the nonmagnetic intermediate layer 2B, and the free magnetic layer 4 has a three-layered structure including the second free magnetic layer 4C, the nonmagnetic intermediate layer 4B disposed on the second free magnetic layer 4C, and the first free magnetic layer 4A disposed on the nonmagnetic intermediate layer 4B.

Since the steps other than the above is the same as those described in detail in the second embodiment, a description thereof will be omitted.

Fifth Embodiment

Figure 11:
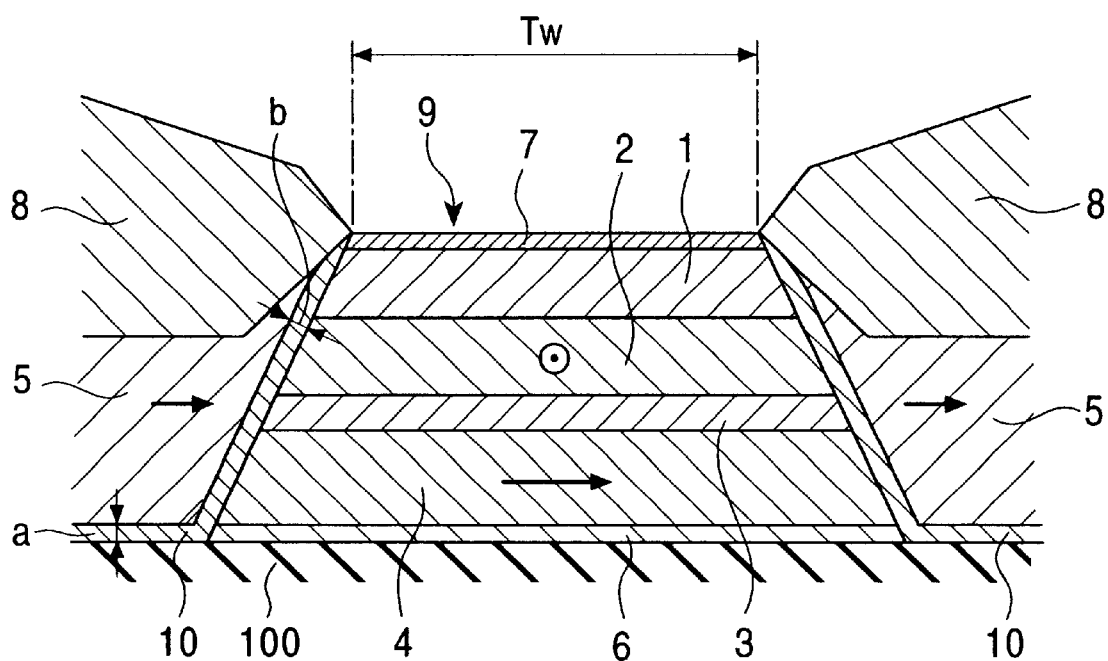
FIG. 11 is a sectional view of a spin-valve thin-film magnetic element in a fifth embodiment of the present invention, viewed from a surface facing a recording medium.

FIG. 11 is a sectional view of a spin-valve thin-film magnetic element in a fifth embodiment of the present invention, viewed from a surface facing a recoding medium.

The spin-valve thin-film magnetic element shown in FIG. 11 is a so-called "top type" single spin-valve thin-film magnetic element in which an antiferromagnetic layer 1, a pinned magnetic layer 2, a nonmagnetic conductive layer 3, and a free magnetic layer 4 are deposited in reverse order to that in the first embodiment.

For the spin-valve thin-film magnetic element, a magnetic recording medium, such as a hard disk, travels in the Z direction in the drawing, and a fringing magnetic field from the magnetic recording medium is directed in the Y direction.

In the spin-valve thin-film magnetic element, the magnetization direction of the pinned magnetic layer 2 is pinned in a direction opposite to the Y direction.

As shown in FIG. 11, underlying layer 6 is provided on a substrate 100. The free magnetic layer 4 is formed on the underlying layer 6, and the nonmagnetic conductive layer 3 is formed on the free magnetic layer 4. The pinned magnetic layer 2 is formed on the nonmagnetic conductive layer 3, the antiferromagnetic layer 1 is formed on the pinned magnetic layer 2, and a protective layer 7 is formed on the antiferromagnetic layer 1.

Reference numeral 10 represents a bias underlying layer, reference numeral 5 represents a bias layer, and reference numeral 8 represents an electrode layer. The individual layers from the underlying layer 6 to the protective layer 7 constitute a laminate 9.

The underlying layer 6 is composed of Ta or the like and is disposed on the substrate 100 to facilitate the formation of the free magnetic layer constituting the laminate 9.

The free magnetic layer 4 is preferably composed of a ferromagnetic material, such as Co, an Ni—Fe alloy, a Co—Ni—Fe alloy, a Co—Fe alloy, or a Co—Ni alloy. The free magnetic layer 4 usually has a thickness of approximately 2 to 5 nm.

The nonmagnetic conductive layer 3 is composed of a nonmagnetic metal, such as Cu, Cr, Au, Ag, Rh, or Ir, and usually has a thickness of approximately 2 to 4 nm. The nonmagnetic conductive layer 3 allows spin-dependent scattering of conduction electrons to occur at the interface between the ferromagnetic pinned magnetic layer 2 and the free magnetic layer 4, resulting in a giant magnetoresistance effect (GMR effect).

The pinned magnetic layer 2 is a ferromagnetic thin film, for example, composed of Co, an Ni—Fe alloy, a Co—Ni—Fe alloy, a Co—Fe alloy, or a Co—Ni alloy. The pinned magnetic layer 2 preferably has a thickness of approximately 4.0 nm.

As the antiferromagnetic layer 1, an Ir—Mn alloy, a Pt—Mn alloy, an Fe—Mn alloy, an Ni—Mn alloy, or the like having a high resistivity is used. For example, all of the Ir—Mn alloy, the Pt—Mn alloy, the Fe—Mn alloy, and the Ni—Mn alloy have a resistivity of approximately 200 $\mu\Omega cm^{-1}$, which is one order of magnitude higher than the resistivity on the order of 10 $\mu\Omega cm^{-1}$ of the Ni—Fe alloy or the like constituting the pinned magnetic layer 2 and the free magnetic layer 4, and which is two orders of magnitude higher than the resistivity on the order of 1 $\mu\Omega cm^{-1}$ of Cu constituting the nonmagnetic conductive layer 3.

Since the antiferromagnetic layer 1 has a large resistivity, the sensing current is subjected to a large resistance. Therefore, the sensing current from the electrode layer 8 passes through the bias layer 5 and flows into the pinned magnetic layer 2 and the free magnetic layer 4.

The spin-valve thin-film magnetic element in the fifth embodiment is also provided with thin films composed of Fe or an Fe—Co alloy, with a thickness of 1.6 to 4.3 nm, as the bias underlying layers 10. In the spin-valve thin-film magnetic element in the fifth embodiment, it is also possible to increase the coercive force of the Co—Pt alloy constituting the bias layers 5 to 750 Oe or more by setting the ratio b/a at 1 or more, and thereby a bias magnetic field can be effectively applied to the free magnetic layer 4. Consequently, the free magnetic layer 4 can be satisfactorily aligned in a single-domain state, and it is possible to obtain a spin-valve thin-film magnetic element having superior stability in which Barkhausen noise is reduced.

Preferably, the bias layers 5 composed of the Co—Pt alloy have a thickness of approximately 20 to 50 nm, and in such a case, the Co—Pt alloy can exhibit a high coercive force under the influence of the bias underlying layers 10 composed of Fe or the Fe—Co alloy with a thickness of 1.6 to 4.3 nm. The bias layers 5 may be composed of a Co—Cr—Pt alloy, a Co—Cr—Ta alloy, or the like, instead of the Co—Pt alloy.

Since the bias layers 5 are magnetized in the X1 direction in the drawing, the magnetization of the free magnetic layer 4 is aligned in the X1 direction. Thereby, the variable magnetization of the free magnetic layer 4 and the pinned magnetization of the pinned magnetic layer 2 are perpendicular to each other.

In the spin-valve thin-film magnetic element, a sensing current is applied from the electrode layers 8 to the pinned magnetic layer 2, the nonmagnetic conductive layer 3, and the free magnetic layer 4. If a magnetic field is applied from a magnetic recording medium in the Y direction in FIG. 11, the magnetization of the free magnetic layer 4 is rotated from the X1 direction to the Y direction. At this stage, spin-dependent scattering of conduction electrons occurs at the interface between the nonmagnetic conductive layer 3 and the free magnetic layer 4, and therefore, the electrical resistance is changed, and a fringing magnetic field from the recording medium is detected.

As described above, in the spin-valve thin-film magnetic element in the fifth embodiment, the bias layers 5 easily apply a strong bias magnetic field to the free magnetic layer 4, the free magnetic layer 4 is easily aligned in a single-domain state, and Barkhausen noise can be reduced, and therefore it is possible to obtain a spin-valve thin-film magnetic element having superior stability.

In order to fabricate the spin-valve thin-film magnetic element in the fifth embodiment, when the laminate 9 is formed, the underlying layer 6, the free magnetic layer 4, the nonmagnetic conductive layer 3, the pinned magnetic layer 2, the antiferromagnetic layer 1, and the protective layer 7 are deposited on the substrate 100 in that order.

Since the other fabrication steps are the same as those described in detail in the second embodiment, a description thereof will be omitted.

Lastly, a thin-film magnetic head in the present invention will be described.

Figure 13:
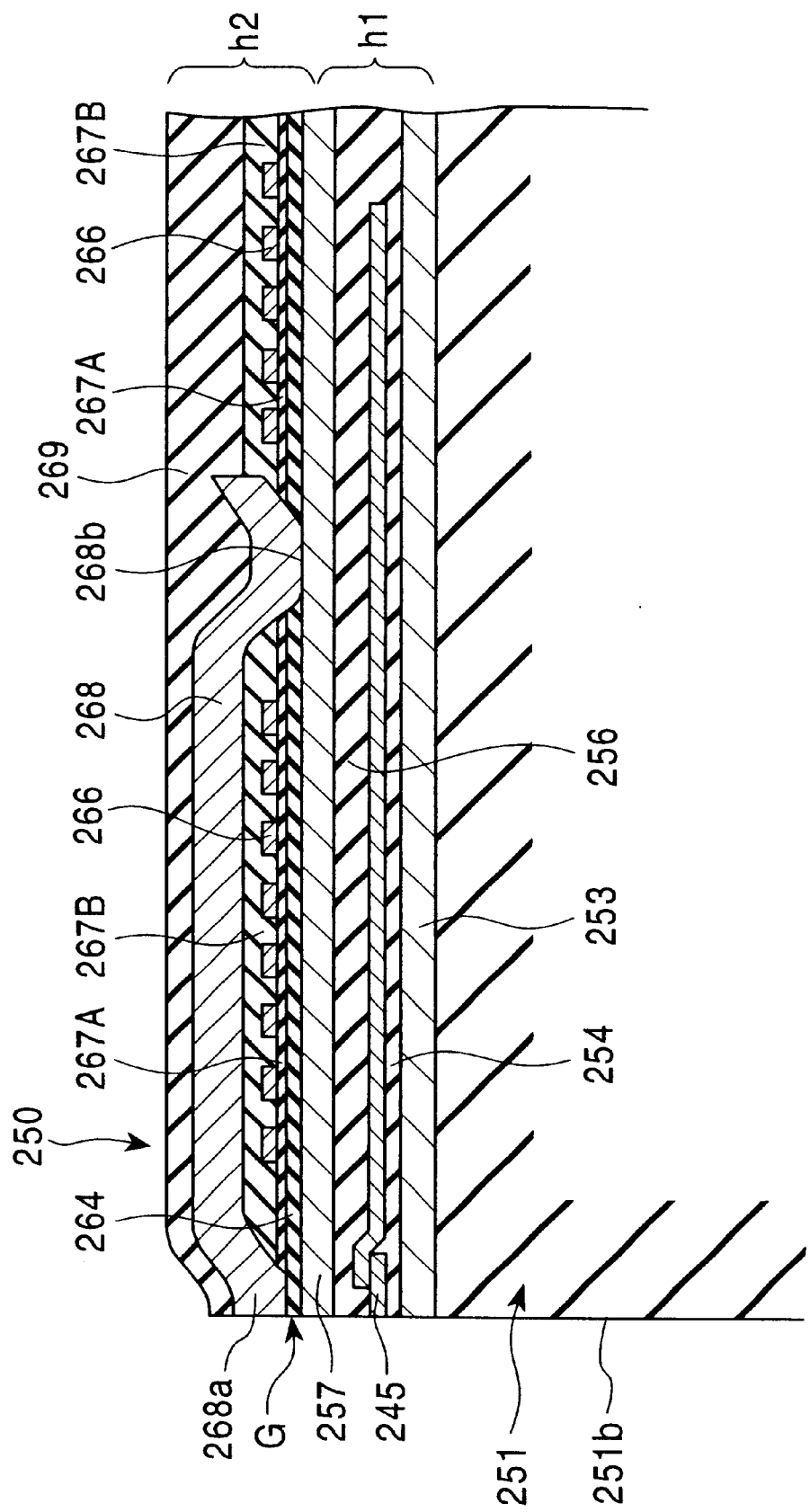
FIG. 13 is a sectional view of a magnetic core section of the thin-film magnetic head shown in FIG. 11.
Figure 14:
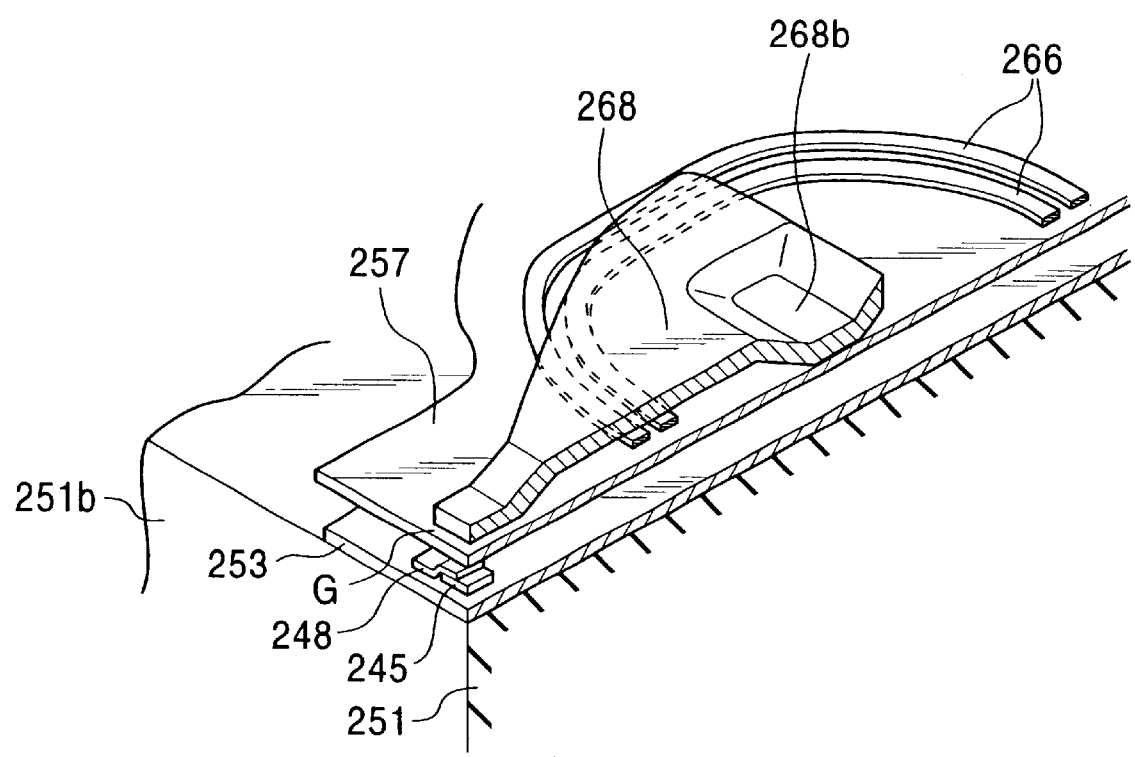
FIG. 14 is a schematic perspective view of the thin-film magnetic head shown in FIG. 11.
Figure 16:
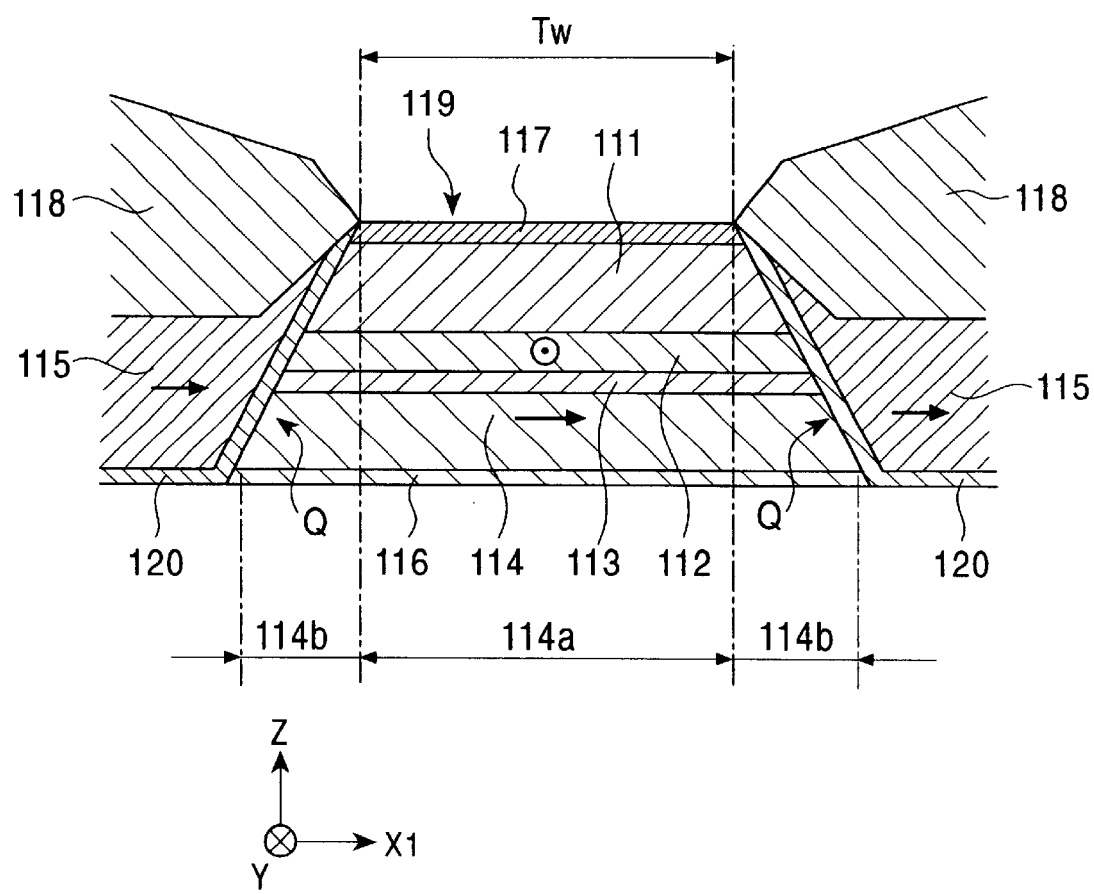
FIG. 16 is a sectional view of another conventional spin-valve thin-film magnetic element, viewed from a surface facing a recording medium.

Basically, the thin-film magnetic head may have the conventional structure, in which a high-performance spin-valve thin-film magnetic element in accordance with the present invention is used instead of the conventional spin-valve thin-film magnetic element. On a magnetic core section 250 shown in FIG. 12, a magnetoresistive element layer 245 is formed by the mounting method as shown in FIGS. 13 and 14. Specific description will be made with reference to the drawings.

Figure 12:
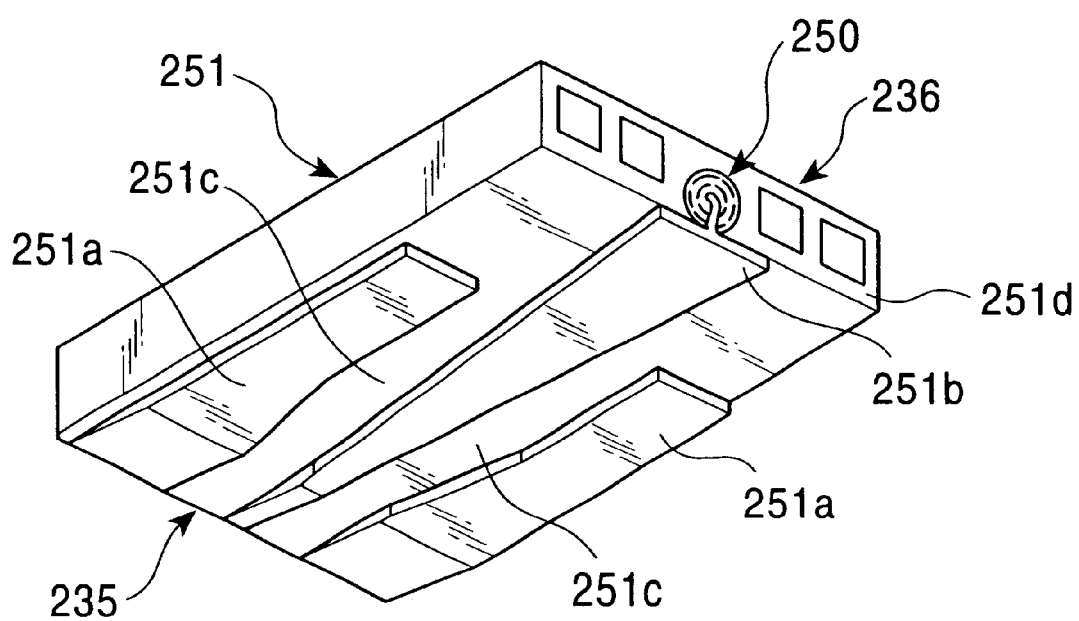
FIG. 12 is a perspective view of a thin-film magnetic head provided with a spin-valve thin-film magnetic element of the present invention.

FIG. 12 is a perspective view of a thin-film magnetic head of the present invention.

The thin-film magnetic head is a floating type mounted on a magnetic recording medium, such as a hard disk drive. In FIG. 12, reference numeral 235 represents the leading side of a slider 251 of the thin-film magnetic head, and reference numeral 236 represents the trailing side. On the surface of the slider 251 facing a disk, rail-shaped air bearing surfaces (ABS) 251a and 251b and air grooves 251c are formed.

The magnetic core section 250 is provided on an end 251d of the slider 215 at the trailing side.

The magnetic core section 250 of the thin-film magnetic head shown here is a combined magnetic head having the structure as shown in FIGS. 13 and 14, in which an MR head (read head) h1 and an inductive head (write head) h2 are deposited in that order on the trailing end 251d of the slider 251.

As shown in FIG. 13, in the MR head h1, a lower shielding layer 253 composed of a magnetic alloy is formed on the trailing end of the slider 251 which also acts as a substrate, and a lower gap layer 254 is provided on the lower shielding layer 253. The magnetoresistive element layer 245 is deposited on the lower gap layer 254. An upper gap layer 256 is formed on the magnetoresistive element layer 245, and an upper shielding layer 257 is formed thereon. The upper shielding layer 257 also acts as a lower core layer of the inductive head h2 which is provided thereon.

In the MR head h1, the resistance of the magnetoresistive element layer 245 is changed in response to a slight amount of a fringing magnetic field from the magnetic recording medium, such as a hard disk, and by detecting the change in resistance, the recorded data in the recording medium is read.

The magnetoresistive element layer 245 is provided with the spin-valve thin-film magnetic element in accordance with the present invention.

The spin-valve thin-film magnetic element is the most important element constituting the thin-film magnetic head (read head).

In the inductive head h2, a gap layer 264 is formed on the lower core layer 257, and a coil layer 266 is spirally patterned thereon. The coil layer 266 is surrounded by a first insulating material layer 267A and a second insulting material layer 267B. An upper core layer 268 is formed on the second insulating material layer 267B, and a magnetic pole end 268a of the upper core layer 268 is opposed to the lower core layer 257 with a magnetic gap G therebetween. As shown in FIGS. 13 and 14, the end 268b is magnetically coupled to the lower core layer 257.

A protective layer 269 composed of alumina or the like is provided on the upper core layer 268.

In the inductive head h2 having the structure as described above, a recording current is applied to the coil layer 266, and recording magnetic flux is applied from the coil layer 266 to the core layers. Magnetic signals are written in a magnetic recording medium, such as a hard disk, by means of a fringing magnetic field between the lower core layer 257 and the tip of the upper core layer 268.

In order to fabricate such a thin-film magnetic head, the lower gap layer 254 is formed on the lower shielding layer 253 composed of a magnetic material, and then the spin-valve thin-film magnetic element constituting the magnetoresistive element layer 245 is formed. The upper shielding layer 257 is formed on the spin-valve thin-film magnetic element with the upper gap layer 256 therebetween, and thereby, the MR head (read head) h1 is completed.

Next, the gap layer 264 is formed on the lower core layer 257 which also acts as the upper shielding layer 257 of the MR head h1, and the spiral coil layer 266 is formed thereon so as to be surrounded by the first insulating material layer 267A and the second insulating material layer 267B. The upper core layer 268 is formed on the second insulating material layer 267B, and the protective layer 269 is provided on the upper core layer 268, and thereby, the thin-film magnetic head is completed.

Since such a thin-film magnetic head is provided with the spin-valve thin-film magnetic element in accordance with the present invention, the magnetic domain of the free magnetic layer can be satisfactorily controlled, and asymmetry and Barkhausen noise are reduced, and thus a stable thin-film magnetic head with high sensitivity can be obtained.

Since the thin-film magnetic head of the present invention is provided with either one of GMR elements in the embodiments shown in FIGS. 3, 4, 9, and 10, it is fully suitable for track narrowing associated with an improvement in the recording density.

EXAMPLE

In this example, with respect to spin-valve thin-film magnetic elements having narrowed track widths, the effect of reducing Barkhausen noise due to the formation of Fe—Co ferromagnetic layers as bias underlying layers was observed.

The spin-valve thin-film magnetic elements similar to those in the third embodiment shown in FIG. 9 were used.

The optical track width Tw in FIG. 9 was set at 0.3 μm. An element having a height (h) in the Y direction of 0.4 μm and an element having a height (h) in the Y direction of 0.2 μm (i.e., track width/element height=1.5) were fabricated.

In the laminate 9, the individual layers from the bottom had the following thicknesses (nm): Ta3/Pt—Mn15/Co2/Ru/Co2.5/Cu2.7/Co5/Ta2.

As bias underlying layers, Fe—Co alloy films were used. The bias underlying layers were formed, with a deposition angle (θ) of 45 degrees, so that the thickness (a) of the bias underlying layers extending from the bottom of the inclined plane of the laminate, parallel to the substrate, was 2.0 nm and the thickness (b) of the bias underlying layers formed on the inclined planes of the laminate was 2.5 nm, namely, b/a=1.25.

Next, bias layers composed of a Co—Pt alloy having a thickness of 3 nm were formed on the bias underlying layers.

First, an electric current was applied from electrode layers to send a signal for varying the magnetic field, and the Barkhausen jump and the hysteresis were measured. For comparison, measurement of the spin-valve thin-film magnetic elements having the same layered structure as that in this example, in which chromium (Cr) films were used as bias underlying layers, was performed in the same way. The results thereof are shown in FIGS. 17 and 18.

Figure 17:
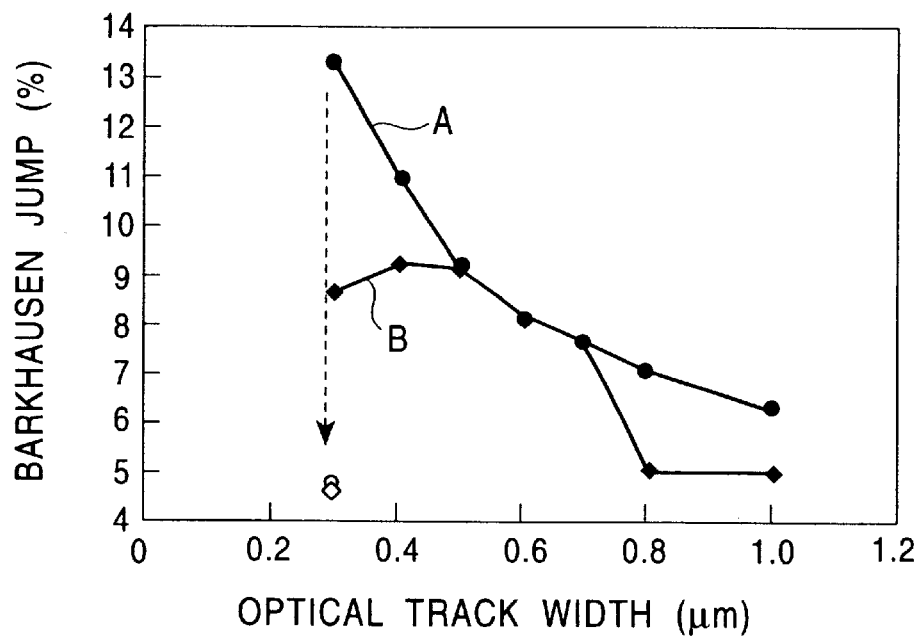
FIG. 17 is a graph showing the relationship between the optical track width and the Barkhausen jump.
Figure 18:
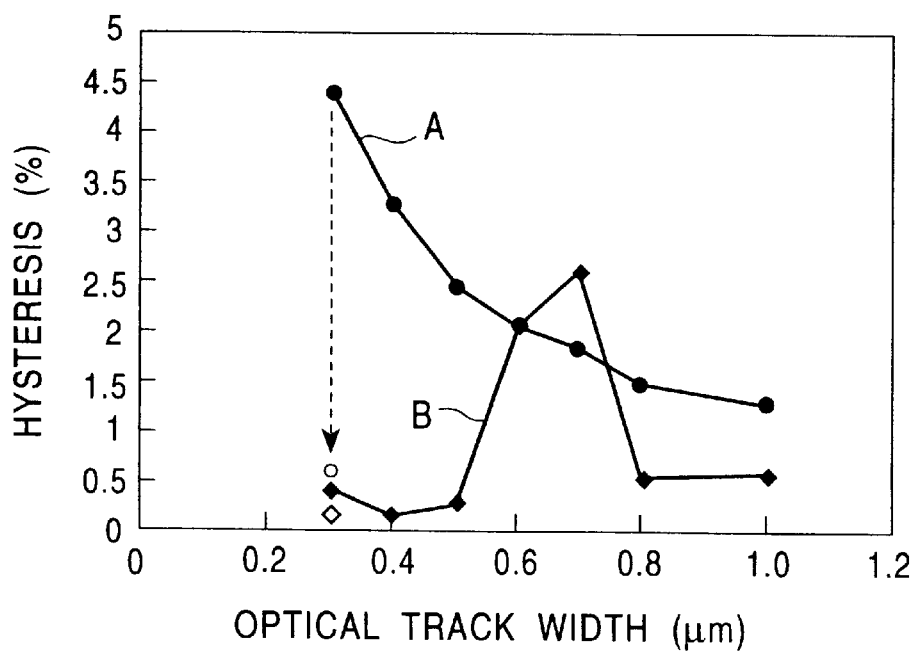
FIG. 18 is a graph showing the relationship between the optical track width and the hysteresis.

In FIGS. 17 and 18, in the case in which the height (h) of the element was set at 0.4 μm, white circles represent Barkhausen jump and hysteresis, respectively; and in the case in which the height (h) of the element was set at 0.2 μm (i.e., track width/element height=1.5), white squares represent Barkhausen jump and hysteresis, respectively.

In FIGS. 17 and 18, in the case in which the optical track width was changed from 0.3 μm to 1 μm and the element height was changed so that the ratio of the track width to the element height was equal to 1.5, curves A plotted with black circles represent Barkhausen jump and hysteresis, respectively. In the case in which the optical track width was changed from 0.3 μm to 1 μm and the element height was maintained at 0.4 μm, curves B plotted with black squares represent Barkhausen jump and hysteresis, respectively.

As shown in FIG. 17, in the spin-valve thin-film magnetic elements in which the optical track width was decreased to 0.3 μm, in the case in which the bias underlying layers composed of Fe—Co alloy films in accordance with the present invention were used, as compared with the case in which the conventional bias underlying layers composed of Cr films were used, the Barkhausen jump greatly decreased from 13% or more to 5% or less when the ratio of the track width to the element height was equal to 1.5, and the Barkhausen jump decreased from approximately 9% to 5% or less even when the element height was maintained at 0.4 μm.

As shown in FIG. 18, in the spin-valve thin-film magnetic elements in which the optical track width was decreased to 0.3 μm, in the case in which the bias underlying layers composed of Fe—Co alloy films in accordance with the present invention were used, as compared with the case in which the conventional bias underlying layers composed of Cr films were used, the hysteresis greatly decreased from 4.5% to 0.5% or less when the ratio of the track width to the element height was equal to 1.5, and the hysteresis slightly decreased even when the element height was maintained at 0.4 μm.

As has been thus confirmed, by using the Fe—Co alloy films as the bias underlying layers, it is possible to obtain spin-valve thin-film magnetic elements in which Barkhausen noise is suppressed.

As described above, a spin-valve thin-film magnetic element in the present invention is a bottom-type single spin-valve thin-film magnetic element including a laminate which includes an antiferromagnetic layer formed on a substrate, a pinned magnetic layer in contact with the antiferromagnetic layer, a nonmagnetic conductive layer in contact with the pinned magnetic layer, a free magnetic layer in contact with the nonmagnetic conductive layer, and a nonmagnetic protective layer in contact with the free magnetic layer; bias layers formed on both sides in the track-width direction of the laminate; and electrode layers formed on the bias layers. The bias layers are formed on both sides of the laminate and also extend over the peripheral sections of the laminate with bias underlying layers therebetween, the bias underlying layers being composed of Fe or an Fe—Co alloy, and having a thickness of 1.6 to 4.3 nm.

Since the bias layers composed of a Co—Pt alloy is formed on the bias underlying layers composed of Fe or the Fe—Co alloy with a thickness of approximately 2 nm, it is possible to maintain the coercive force of the bias layers composed of the Co—Pt alloy at the highest level. Therefore, a bias magnetic field can be effectively applied to the free magnetic layer, the demagnetizing field is prevented from occurring in the free magnetic layer, and the free magnetic layer is easily aligned in a single-domain state. Consequently, even if the track width is decreased the recording density is increased, it is possible to provide a thin-film magnetic head in which Barkhausen noise is reduced and which performs stably.

A spin-valve thin-film magnetic element in the present invention is a top-type single spin-valve thin-film magnetic element including a laminate which includes a free magnetic layer formed on a substrate, a nonmagnetic conductive layer in contact with the free magnetic layer, a pinned magnetic layer in contact with the nonmagnetic conductive layer, an antiferromagnetic layer in contact with the pinned magnetic layer, and a nonmagnetic protective layer in contact with the antiferromagnetic layer; bias layers formed on both sides of the laminate; and electrode layers formed on the bias layers. The bias layers are formed on both sides of the laminate and also extend over the peripheral sections of the laminate with bias underlying layers therebetween, the bias underlying layers being composed of Fe or an Fe—Co alloy, and having a thickness of 1.6 to 4.3 nm.

In the spin-valve thin-film magnetic element, the bias layers easily apply a strong bias magnetic field to the free magnetic layer, the free magnetic layer is easily aligned in a single-domain state, and Barkhausen noise can be reduced, and therefore, a spin-valve thin-film magnetic element having superior stability is provided.

In the spin-valve thin-film magnetic element, since the bias layers composed of a Co—Pt alloy is also formed on the bias underlying layers composed of Fe or the Fe—co alloy with a thickness of approximately 2 nm, it is possible to maintain the coercive force of the bias layers composed of the Co—Pt alloy at the highest level. Therefore, a bias magnetic field can be effectively applied to the free magnetic layer, the demagnetizing field is prevented from occurring in the free magnetic layer, and the free magnetic layer is easily aligned in a single-domain state. Consequently, even if the track width is decreased as the recording density is increased, it is possible to provide a thin-film magnetic head in which Barkhausen noise is reduced and which performs stably.

In the spin-valve thin-film magnetic element, a synthetic-ferri-pinned structure may be employed, in which the pinned magnetic layer includes a first pinned magnetic sublayer and a second pinned magnetic sublayer interposed by a nonmagnetic intermediate layer, the magnetization direction of the first pinned magnetic sublayer being pinned by an exchange anisotropic magnetic field with the antiferromagnetic layer, the magnetization direction of the second pinned magnetic sublayer being antiparallel to the magnetization direction of the first pinned magnetic sublayer. In such a case, the demagnetizing field (dipole magnetic field) due to the pinned magnetization of the pinned magnetic layer can be cancelled by the magnetostatic coupling magnetic field of the first pinned magnetic sublayer and the magnetostatic coupling magnetic field of the second pinned magnetic sublayer. Thereby, it is possible to decrease the influence of the demagnetizing field (dipole magnetic field) due to the pinned magnetization of the pinned magnetic layer upon the variable magnetization of the free magnetic layer.

In the spin-valve thin-film magnetic element in which the pinned magnetic layer is divided into two by the nonmagnetic intermediate layer, one of the pinned magnetic sublayer pins the other pinned magnetic sublayer in an appropriate direction, and thereby the pinned magnetic layer can be maintained in a very stable state.

In the spin-valve thin-film magnetic element described above, since the bias layers composed of a Co—Pt alloy are formed on the bias underlying layers composed of Fe or an Fe—Co alloy with a thickness of approximately 2 nm, it is possible to maintain the coercive force of the bias layers composed of the Co—Pt alloy at the highest level. Therefore, a bias magnetic field can be effectively applied to the free magnetic layer, the demagnetizing field is prevented from occurring in the free magnetic layer, and the free magnetic layer is easily aligned in a single-domain state. Consequently, even if the track width is decreased as the recording density is increased, it is possible to provide a thin-film magnetic head in which Barkhausen noise is reduced and which performs stably.

In the spin-valve thin-film magnetic element of the present invention, the free magnetic layer may be divided into a first free magnetic sublayer and a second free magnetic sublayer by a nonmagnetic intermediate layer, the first free magnetic sublayer being disposed at the nonmagnetic protective layer side, the second free magnetic layer being disposed at the nonmagnetic conductive layer side.

Since the free magnetic layer is divided into two by the nonmagnetic intermediate layer, an exchange coupling magnetic field is produced between the free magnetic sublayers, resulting in a ferrimagnetic state, and since the magnetic thickness is decreased, the magnetization direction of the free magnetic layer can be reversed with high sensitivity in response to an external magnetic field.

By employing such a structure of the free magnetic layer, the ferrimagnetic state of the free magnetic layer can be maintained while stably maintaining the antiferromagnetic coupling between the first and second free magnetic sublayers. Therefore, the sensitivity of the spin-valve thin-film magnetic element can be improved without a decrease in the rate of resistance change ($\Delta R/R$) due to a decrease in the physical thickness of the free magnetic layer.

Since the principal part of the bias layer is joined to each side of the laminate, the effective magnetic field applied to the free magnetic layer is not substantially decreased due to the absorption of the fringing magnetic flux from the bias layer by the upper shielding layer, etc., and the free magnetic layer is easily aligned in a single-domain state, and therefore, it is possible to provide a spin-valve thin-film magnetic element in which the magnetic domain of the free magnetic layer can be satisfactorily controlled.

A strong bias magnetic field is also easily applied to the free magnetic layer, and the free magnetic layer is easily aligned in a single-domain state, and thereby it is possible to reduce Barkhausen noise.

In the spin-valve thin-film magnetic element described above, since the bias layers composed of the Co—Pt alloy is formed on the bias underlying layers composed of Fe or the Fe—Co alloy with a thickness of approximately 2 nm, the coercive force of the bias layers composed of the Co—Pt alloy can be maintained at the highest level. Therefore, the bias magnetic field can be effectively applied to the free magnetic layer, and also since the free magnetic layer, the bias underlying layers, and the bias layers are directly, magnetically coupled to each other by the exchange interaction, the demagnetizing field is prevented from occurring in the edges of the free magnetic layer, and the free magnetic layer can be easily aligned in a single-domain state. Consequently, it is possible to provide a thin-film magnetic head which performs stably in which Barkhausen noise is reduced even if the track width is decreased as the recording density is increased.

In the spin-valve thin-film magnetic element of the present invention, when metal layers composed of at least one metal selected from the group consisting of Cr, Ta, and W are interposed between the electrode layers and the bias layers, the metal layers act as diffusion barriers in the thermal process, such as the resist-hardening step subsequently carried out, and it is possible to prevent the magnetic properties of the bias layers from degrading. When Ta is used as the electrode layers, the Ta crystal deposited on Cr is easily formed so as to have a body-centered cubic structure having a lower resistance.

In the spin-valve thin-film magnetic element of the present invention, by using the antiferromagnetic layer composed of either an X—Mn alloy or a Pt—Mn—X' alloy, in comparison with the antiferromagnetic layer composed of the NiO alloy, FeMn alloy, NiMn alloy, or the like which has been conventionally used, it is possible to provide a spin-valve thin-film magnetic element in which superior characteristics, such as a larger exchange coupling magnetic field, a higher blocking temperature, and superior corrosion resistance, are exhibited.

In a method for fabricating a spin-valve thin-film magnetic element in accordance with the present invention, when the spin-valve thin-film magnetic element described above is fabricated, the method includes the steps of forming a laminate by depositing an antiferromagnetic layer, a pinned magnetic layer in contact with the antiferromagnetic layer, a nonmagnetic conductive layer in contact with the pinned magnetic layer, and a free magnetic layer in contact with the nonmagnetic conductive layer on a substrate; forming a lift-off resist layer, provided with notches on the lower surface facing the laminate, on the laminate; removing the region which is not covered with the lift-off resist layer by ion milling so that the laminate has a trapezoidal cross-section; forming bias underlying layers by performing sputtering on both inclined sides of the laminate and over the peripheral sections of the laminate while a sputtering target is opposed to the substrate at a predetermined angle; forming bias layers on the bias underlying layers by performing sputtering while a sputtering target for the bias layers is opposed to the substrate in parallel or at a predetermined angle; and forming electrode layers on the bias layers by performing sputtering while a sputtering garget for the electrode layers is opposed to the substrate in parallel or at a predetermined angle. By using the method described above, the bias underlying layers can be accurately controlled so as to have predetermined thicknesses, and a high-performance spin-valve thin-film magnetic element can be easily fabricated.

In accordance with the method for fabricating the spin-valve thin-film magnetic element of the present invention, by opposing the sputtering target for the bias underlying layers composed of Fe or an Fe—Co alloy to the substrate provided with the trapezoidal laminate at an angle, and by setting the angle appropriately so that sputtered particles are deposited on the intended sections, the bias underlying, layers with desired thicknesses can be obtained. Moreover, it is also possible to make the thickness of the bias underlying layers on the sides of the laminate larger than the thickness of the bias underlying layers extending over the peripheries of the laminate.

By appropriately setting the angle between the substrate and the sputtering target, the thicknesses of the bias underlying layers can be accurately controlled.

Since the thin-film magnetic head of the present invention is provided with the spin-valve thin-film magnetic element described above, a high-performance magnetic head with superior stability is obtained, in which the magnetic domain of the free magnetic layer can be satisfactorily controlled, and Barkhausen noise is reduced, and which is suitable for track narrowing due to an improvement in the recording density.

What is claimed is:

1. A spin-valve thin-film magnetic element comprising:
   a laminate formed on a substrate, the laminate comprising an antiferromagnetic layer, a pinned magnetic layer in contact with the antiferromagnetic layer, a nonmagnetic conductive layer in contact with the pinned magnetic layer, and a free magnetic layer in contact with the nonmagnetic conductive layer;
   bias layers formed on both sides in the track-width direction of the laminate; and
   electrode layers formed on the bias layers,
   wherein the bias layers are in contact with both sides of the laminate and extend over the peripheral sections of the laminate with ferromagnetic bias underlying layers therebetween, the bias layers comprising a Co—Pt alloy having a mixture of a face-centered cubic (fcc) structure and a hexagonal close-packed (hcp) structure, the bias underlying layers comprising Fe or an Fe—Co alloy having a body-centered cubic (bcc) structure and a thickness of 1.8 to 2.5 nm, further wherein the Fe or Fe—Co alloy has a lattice constant that is close to that of the Co—Pt alloy.

2. A spin-valve thin-film magnetic element according to claim 1, wherein the thickness of the bias underlying layers formed on both sides of the laminate is equal to or larger than the thickness of the bias underlying layers extending parallel to the substrate over the peripheral sections of the laminate.

3. A spin-valve thin-film magnetic element according to claim 1, wherein the laminate further comprises a nonmagnetic underlying layer deposited as an undermost layer and a nonmagnetic protective layer deposited as an uppermost layer, and the free magnetic layer comprises a first free magnetic sublayer, a second free magnetic sublayer, and a nonmagnetic intermediate layer interposed between the first free magnetic sublayer and the second free magnetic sublayer, the first free magnetic sublayer being disposed at the nonmagnetic protective layer side or at the nonmagnetic underlying layer side, and the second free magnetic sublayer being disposed at the nonmagnetic conductive layer side.

4. A spin-valve thin-film magnetic element according to claim 1, wherein the pinned magnetic layer comprises a first pinned magnetic sublayer, a second pinned magnetic sublayer, and a nonmagnetic intermediate layer interposed between the first pinned magnetic sublayer and the second pinned magnetic sublayer, the magnetization direction of the first pinned magnetic sublayer being pinned by an exchange anisotropic magnetic field with the antiferromagnetic layer, and the magnetization direction of the second pinned magnetic sublayer being aligned antiparallel to the magnetization direction of the first pinned magnetic sublayer.

5. A spin-valve thin-film magnetic element according to claim 4, wherein the laminate further comprises a nonmagnetic underlying layer deposited as an undermost layer and a nonmagnetic protective layer deposited as an uppermost layer, and the free magnetic layer comprises a first free magnetic sublayer, a second free magnetic sublayer, and a nonmagnetic intermediate layer interposed between the first free magnetic sublayer and the second free magnetic sublayer, the first free magnetic sublayer being disposed at the nonmagnetic protective layer side or at the nonmagnetic underlying layer side, and the second free magnetic sublayer being disposed at the nonmagnetic conductive layer side.

6. A spin-valve thin-film magnetic element according to claim 1, wherein the Fe—Co alloy comprises 20 atomic % or more of Fe and the balance being Co and incidental impurities.

* * * * *